United States Patent
Pai et al.

(10) Patent No.: US 8,654,684 B1
(45) Date of Patent: Feb. 18, 2014

(54) MULTI-PLATFORM VIDEO DELIVERY CONFIGURATION

(75) Inventors: Sukesh Hosdurg Pai, San Francisco, CA (US); Kalpesh Balar, San Francisco, CA (US); Vishal Nagota, San Francisco, CA (US); Kumar Subramanian, San Francisco, CA (US)

(73) Assignee: Media Melon, Inc., San Francisco, CA (US)

( * ) Notice: Subject to any disclaimer, the term of this patent is extended or adjusted under 35 U.S.C. 154(b) by 0 days.

(21) Appl. No.: 13/459,170

(22) Filed: Apr. 28, 2012

Related U.S. Application Data

(63) Continuation of application No. 12/323,383, filed on Nov. 25, 2008, now Pat. No. 8,169,916, which is a continuation of application No. 12/276,243, filed on Nov. 21, 2008, now abandoned.

(60) Provisional application No. 61/101,978, filed on Oct. 1, 2008, provisional application No. 60/996,541, filed on Nov. 23, 2007.

(51) Int. Cl.
*H04L 12/16* (2006.01)

(52) U.S. Cl.
USPC ........... 370/260; 370/236; 370/237; 370/238; 370/240; 709/200; 709/219; 709/223; 709/226

(58) Field of Classification Search
USPC .......... 370/236, 237, 238, 240, 260; 709/200, 709/219, 223, 226; 455/412, 426, 466
See application file for complete search history.

(56) References Cited

U.S. PATENT DOCUMENTS

| | | | |
|---|---|---|---|
| 6,014,693 A * | 1/2000 | Ito et al. | 709/219 |
| 6,438,596 B1 * | 8/2002 | Ueno et al. | 709/226 |
| 6,466,980 B1 * | 10/2002 | Lumelsky et al. | 709/226 |
| 6,556,217 B1 * | 4/2003 | Makipaa et al. | 345/667 |
| 6,680,976 B1 * | 1/2004 | Chen et al. | 375/240.26 |
| 6,876,628 B2 * | 4/2005 | Howard et al. | 370/232 |
| 7,039,784 B1 * | 5/2006 | Chen et al. | 711/170 |
| 7,219,163 B2 * | 5/2007 | Robinson et al. | 709/246 |
| 7,523,170 B1 * | 4/2009 | Allen et al. | 709/217 |
| 7,558,870 B2 * | 7/2009 | Parker | 709/231 |
| 7,613,818 B2 * | 11/2009 | Cherkasova et al. | 709/231 |
| 7,650,376 B1 | 1/2010 | Blumenau | |

(Continued)

OTHER PUBLICATIONS

US. Office Action Dated Dec. 5, 2008, U.S. Appl. No. 11/257,532, filed Oct. 25, 2005.

(Continued)

*Primary Examiner* — Andrew Lai
*Assistant Examiner* — Andrew C Lee

(57) ABSTRACT

A system and a method are disclosed for delivering a video to a destination device using multiple sources and multiple protocols. The video can be on demand or a live video. A video is divided into several chunks distributed across devices and servers in the network. A node is selected for delivering a video chunk based on criteria including the cost of delivery of the chunk from the node to the destination node. This also improves the throughput of the entire system. Different nodes can use different communication protocols for delivering chunks of videos. Portions of videos are forward-cached to a node before a request for the video is made by the node. Activities associated with a device are gathered to determine a profile for the device. The profile of the device is used to select videos to be forward-cached to the peer device.

16 Claims, 19 Drawing Sheets

(56) References Cited

U.S. PATENT DOCUMENTS

| | | | |
|---|---|---|---|
| 7,843,868 B2 * | 11/2010 | Yamada et al. | 370/325 |
| 8,169,916 B1 | 5/2012 | Pai et al. | |
| 8,370,732 B2 * | 2/2013 | Black et al. | 715/205 |
| 2001/0049740 A1 * | 12/2001 | Karpoff | 709/231 |
| 2003/0061305 A1 | 3/2003 | Copley et al. | |
| 2003/0099298 A1 * | 5/2003 | Rose et al. | 375/240.27 |
| 2003/0110503 A1 | 6/2003 | Perkes | |
| 2003/0120748 A1 | 6/2003 | Begeja et al. | |
| 2004/0044600 A1 * | 3/2004 | Chu et al. | 705/34 |
| 2004/0103189 A1 * | 5/2004 | Cherkasova et al. | 709/224 |
| 2005/0021822 A1 * | 1/2005 | Cherkasova et al. | 709/232 |
| 2005/0039213 A1 * | 2/2005 | Matarese et al. | 725/95 |
| 2005/0076058 A1 | 4/2005 | Schwesig et al. | |
| 2006/0112143 A1 | 5/2006 | Subramanian | |
| 2006/0168082 A1 * | 7/2006 | Yang et al. | 709/207 |
| 2006/0168119 A1 * | 7/2006 | Inoue et al. | 709/218 |
| 2006/0224768 A1 | 10/2006 | Allen | |
| 2006/0242664 A1 * | 10/2006 | Kikkawa et al. | 725/37 |
| 2007/0230346 A1 * | 10/2007 | Yamada et al. | 370/235 |
| 2007/0233893 A1 * | 10/2007 | Karpoff | 709/231 |
| 2007/0288638 A1 | 12/2007 | Vuong et al. | |
| 2008/0034293 A1 * | 2/2008 | Vaananen | 715/700 |
| 2008/0034393 A1 * | 2/2008 | Crayford | 725/87 |
| 2008/0059631 A1 | 3/2008 | Bergstrom et al. | |
| 2008/0072264 A1 * | 3/2008 | Crayford | 725/86 |
| 2008/0133767 A1 | 6/2008 | Birrer et al. | |
| 2009/0010336 A1 * | 1/2009 | Au et al. | 375/240.16 |
| 2009/0282440 A1 | 11/2009 | Rodriguez | |
| 2010/0011103 A1 * | 1/2010 | Luzzatti et al. | 709/226 |
| 2010/0146569 A1 | 6/2010 | Janardhan et al. | |
| 2010/0287155 A1 | 11/2010 | Reisman | |
| 2010/0299722 A1 | 11/2010 | Tewari et al. | |
| 2011/0023072 A1 | 1/2011 | Hodzic et al. | |
| 2011/0090898 A1 * | 4/2011 | Patel et al. | 370/352 |

OTHER PUBLICATIONS

Amendment Dated Apr. 3, 2009, U.S. Appl. No. 11/257,532, filed Oct. 25, 2005.
US. Office Action Dated Jul. 8, 2009, U.S. Appl. No. 11/257,532, filed Oct. 25, 2005.
Amendment Dated Jan. 10, 2010, U.S. Appl. No. 11/257,532, filed Oct. 25, 2005.
US. Office Action Dated Dec. 9, 2011, U.S. Appl. No. 11/257,532, filed Oct. 25, 2005.

\* cited by examiner

JW FLV player without video player plug-in interface
JW FLV player with video player plug-in interface
Message 1601
Fig 16

MULTI-PLATFORM VIDEO DELIVERY CONFIGURATION

CROSS REFERENCE TO RELATED APPLICATIONS

This application is a continuation of U.S. patent application Ser. No. 12/323,383, filed Nov. 25, 2008, which is a continuation of U.S. patent application Ser. No. 12/276,243, filed Nov. 21, 2008, which claims the benefit of, and priority to, U.S. Provisional Application No. 61/101,978, filed Oct. 1, 2008, and U.S. Provisional Application No. 60/996,541, filed Nov. 23, 2007, the contents of each of which is incorporated by reference in its entirety.

This application claims the benefit of, and priority to, U.S. Provisional Application No. 61/101,978, filed Oct. 1, 2008, which is incorporated by reference in its entirety.

BACKGROUND

1. Field of Art

The disclosure generally relates to the field of delivery of media files in a distributed environment such as IP (internet protocol) transit networks, content delivery networks and peer-assisted networks.

2. Description of the Related Art

The amount of video traffic over networks, such as the Internet, has been increasingly significantly over the past few years. This increase is being driven by increased user consumption of videos—such as user-generated short clips, as well as commercially produced TV shows and movies—as well as increasing resolution, and hence the increase in bytes of data that comprise such videos.

Currently, typical ways to deliver videos comprise using video servers, hosted in a centralized set of datacenters. In this scenario, when a user requests a video the data comprising that video is streamed, or downloaded, or progressively downloaded, to that user.

The infrastructure, and hence the expense, involved in accomplishing this delivery includes the costs of servers, routers, load balancers, network lines, and other such networking gear and transit mechanisms. The costs, roughly, increase linearly with increasing volume. In general, the bytes delivered increase with increasing video bytes being consumed at viewing devices. In addition the costs, and the infrastructure needs, have to accommodate a volume of traffic that can easily support the peak rates of such traffic. Further, the quality of video playback is, in general, constrained by the weakest network capacity between the server and the viewing device.

The art lacks, inter alia, a system and method that addresses the set of issues described above and provides a video delivery solution that delivers videos by utilizing network infrastructure more efficiently, allowing for advantages such as lower cost of delivery, better playback quality and reducing needs to invest in expensive video delivery infrastructure.

SUMMARY

In one embodiment, a system (and method) delivers an on demand video to a destination peer device in a network of peer devices. In one embodiment, a "peer device" includes a device that could be a viewing device, such as a PC or a mobile phone or an IP Set-Top-Box. It could optionally, have the capability to contribute to the delivery of content to other viewing devices, and be involved in such delivery. The on demand video is divided into one, or more, video chunks distributed across a plurality of peer devices and servers. In response to a request for an on demand video, the peer device obtains a list of peer devices and servers that have chunks of the requested video. A cost is assigned to each peer device and server in the list based on criteria including how fast a video chunk can be received from the peer device or server. The cost assigned to each peer device or server is used to filter the list of peer devices and servers. Certain embodiments communicate with the peer devices or servers in the list to update the information used for determining the cost associated with the peer device or server.

A communication protocol is configured for communicating with each peer device or server. Certain embodiments determine a fetch window of video chunks to be retrieved for presenting the on demand video continuously without stalling. Each video chunk in the fetch window is associated with a peer device or server so as to minimize the total cost of fetching all the video chunks in the fetch window. Requests are sent to the peer device or server associated with the video chunk for retrieving the video chunk.

In another embodiment, a system (and method) delivers a live video to a peer device. The live video can be a streaming video from a streaming server. The live video is divided into video chunks distributed across a plurality of peer devices and servers. In response to a request for a live video, the peer device obtains a list of peer devices and servers that have chunks of the live video. Each peer device or server is associated with a generation number. The generation number of the peer device receiving the video chunk is assigned a value greater than the highest value of generation numbers associated with the peer devices and servers in the list. Chunks of videos are fetched from the peer devices or servers in the list based on cost of delivering the video chunk from the peer device or server.

In another embodiment, a system (and method) forward-caches a portion of a video file into a destination peer device that is highly likely to play the video. Chunks of the video file are available from a plurality of peer devices and servers. Information associated with the destination peer device is gathered. A profile is built for the destination peer device based on the information gathered. The profile information is used to determine a video file that the destination peer device is likely to fetch. A size of the portion of the video file to be forward-cached is determined. The peer device obtains a list of peer devices and servers that have chunks of the portion of video file to be forward-cached. Peer devices or servers are selected from the list to deliver the video chunks based on lowest cost of delivery of the video chunks.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 16 shows a display of a video player, with and without a video player plug-in interface.

DETAILED DESCRIPTION

Figure 1:
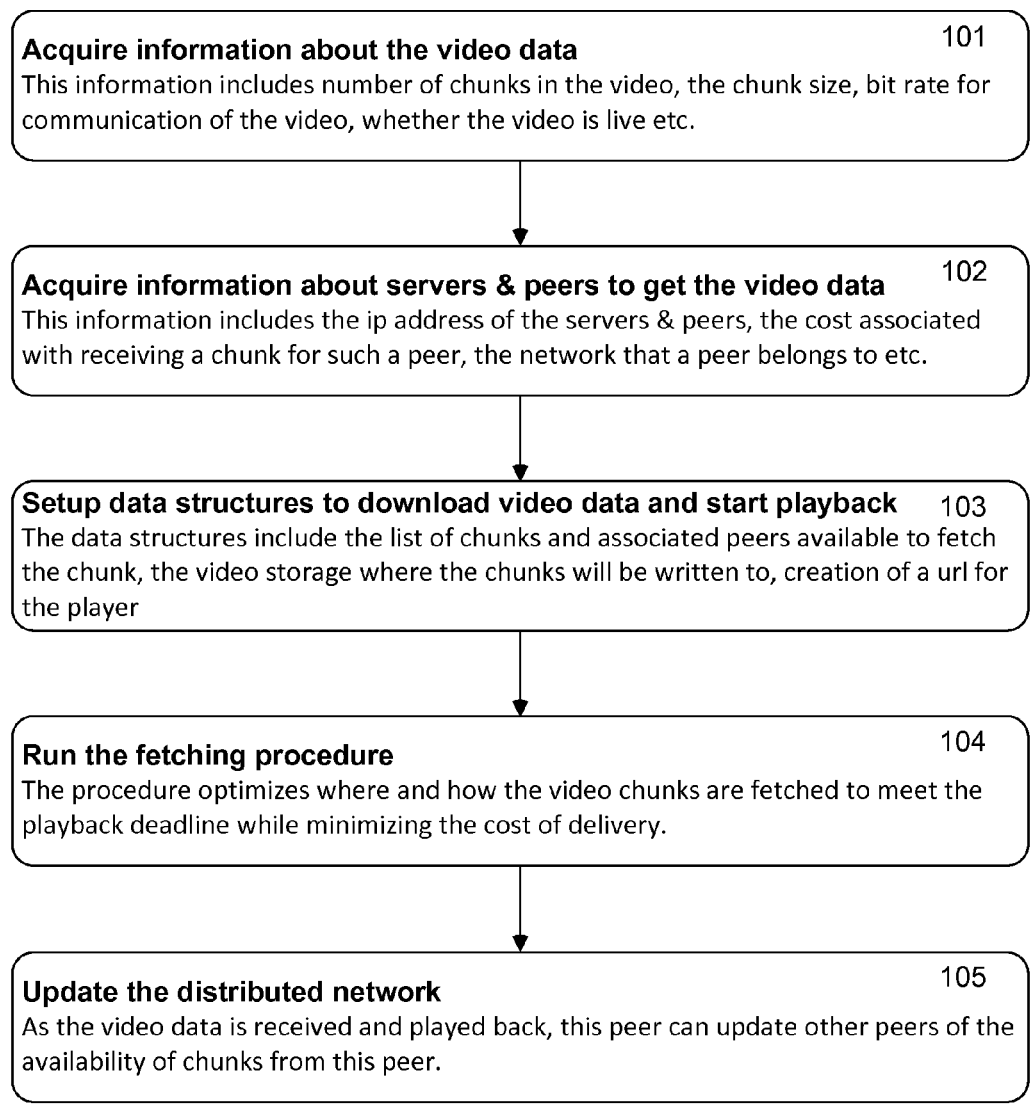
FIG. 1 illustrates one embodiment of the overall process used by a peer device to fetch a video.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

It is noted that the described implementations of peer-to-peer systems have been focused typically on the delivery of data files between the peers in the network and not necessarily as to how the data is consumed. The systems that implement the peer-to-peer protocol are independent of the system that consumes the data delivered. For example, a video file maybe downloaded via a peer-to-peer file sharing system. However, the video can seldom be played using the same system. It needs to be played in a media player software that is separate from the file sharing system that downloaded the video. For ease of discussion, the terms "download" or "downloaded" or "streamed" are used interchangeably to denote the process of delivering a sequence of video data from one source or node, to another. In general, these terms refer to the process of delivering a series of data, which may be stored at the playing device, and may be rendered by a video player.

In one embodiment, video chunks (a video chunk is also referred to as a chunk) are distributed across multiple peers and a video player is configured to obtain video chunks optimally using a combination of distributed systems, such as peer-to-peer systems as well as centralized or managed infrastructure delivery server systems. When the video bits are requested from the player, the system transparently invokes an appropriate protocol transparently to receive the video bits. In addition, one embodiment is configured to enable arbitrary video players, regardless of the operating system or device they run on, to avail the delivery system so as to maximize the use of the available bandwidth. In one embodiment, a system is configured to playback a video at the highest quality permitted by the available bandwidth and can adjust the quality of video as the available bandwidth changes.

In addition, a system is configured for a video player to receive video bits optimally using a combination of peer-to-peer and infrastructure delivery server systems. When the video bits are requested from the player, the system transparently invokes the appropriate protocol to receive the video bits. In addition, one embodiment enables arbitrary video players, regardless of the operating system or device they run on, to avail the delivery system so as to maximize the use of the available bandwidth. The system is also configured to playback a video at the highest quality permitted by the available bandwidth and can adjust the quality of video as the available bandwidth changes.

FIG. 1 illustrates an embodiment of an overall process by which a video divided into chunks distributed across multiple peer devices and servers is fetched by a peer. A peer device acquires 101 the information about video data including number of chunks of the video, the sizes of the chunks, bit rate for communication of the video, and whether the video is on demand or live. The peer device further acquires 102 information about servers and peers that have chunks of the video. This information includes the IP (internet protocol) address of the servers and peers, the cost of receiving a chunk from a server or peer, and the network associated with the particular peer device. The peer device sets up 103 data structures to download video data to allow the video to be played. The data structures include the list of chunks and associated peers available to fetch the chunk, the video storage for storing the chunks, and a URL for the player. The video is fetched 104 using a procedure that optimizes the peer devices from where the video chunks are fetched to meet the playback deadline while minimizing the cost of delivery and improving the throughput of the system. The peer device updates 105 other peer devices with the information about availability of chunks of the video at this peer.

Overall Architecture

One embodiment of an architecture is outlined in figures (FIGS. or figs. or FIGS. 2 through 6. Referring to these figures initially at a high level, the distributed video delivery architecture has a server infrastructure component (e.g., 200), a video delivery engine component (e.g., 409), and the video player plug-in interface (e.g., 505). The server infrastructure refers to a distributed set of servers and programs that run server functionalities at various places in a network, such as at data centers, ISP (internet service provider) points of presence, and at the edge of a network. The video delivery engine and the video player plug-in interfaces are components typically present at a peer device. The peer devices are a group of devices that could include a personal computer, a handheld device such as a mobile phone, portable video player, gaming machine, a cinema projector or any other device capable of connecting to the Internet. Each server in a distributed set of servers is also called a node. A peer device is also referred to as a peer or a peer node or a node. (a server node can also act as a peer)

Figure 18:
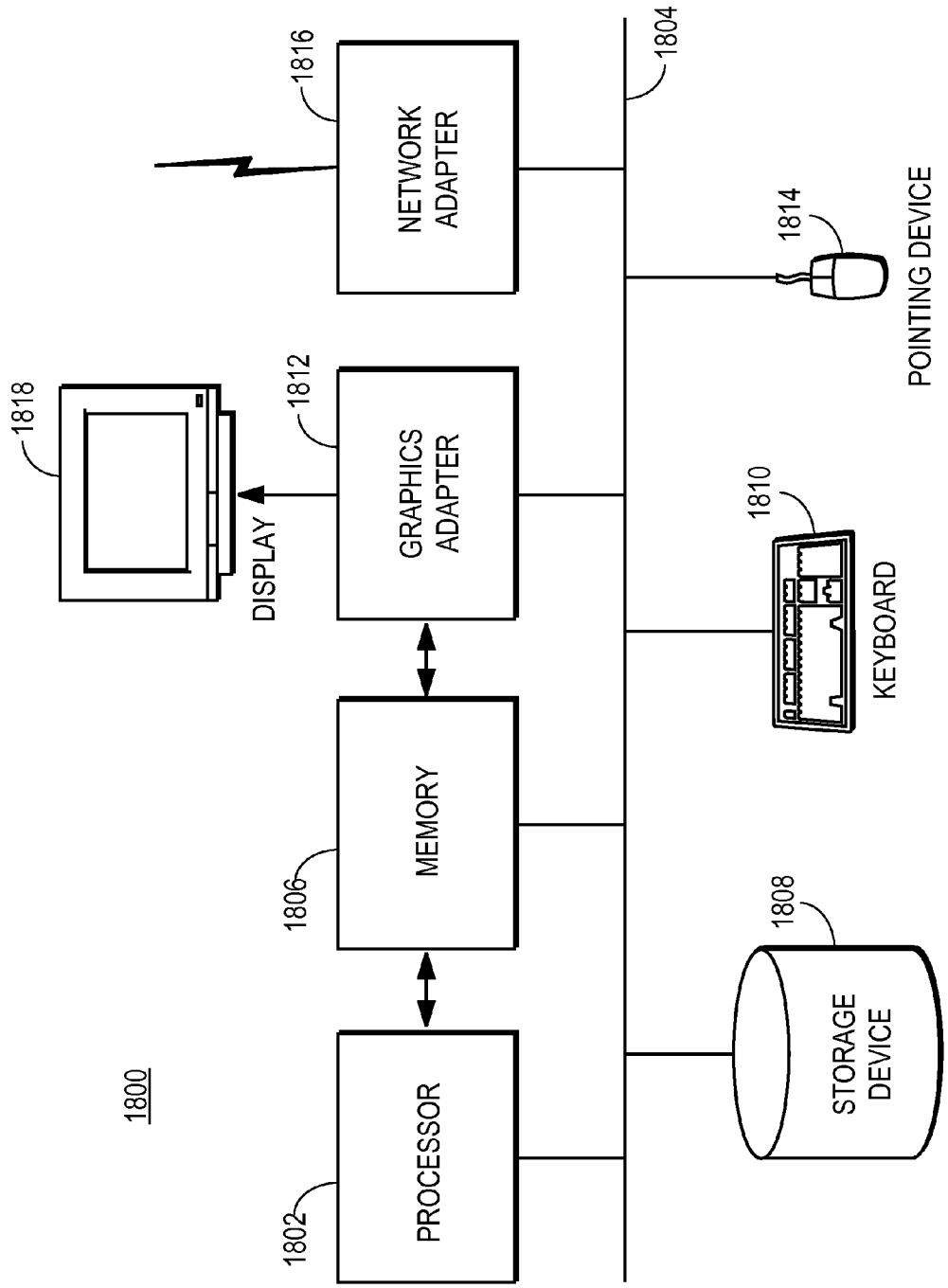
FIG. 18 shows one embodiment of the architecture of a computer device that may be used as a peer device or server.

Next, FIG. 18 is a high-level block diagram illustrating a functional view of a typical computer 200 for use as a peer device 305 or a server that can be a data center 210 or an edge network center 211. Illustrated are at least one processor 1802 coupled to a bus 1804. Also coupled to the bus 1804 are a memory 1806, a storage device 1808, a keyboard 1810, a graphics adapter 1812, a pointing device 1814, and a network adapter 1816. A display 1818 is coupled to the graphics adapter 1812.

The processor 1802 may be any general-purpose processor such as an INTEL compatible-CPU (central processing unit). The storage device 208 is, in one embodiment, a hard disk drive but can also be any other device capable of storing data, such as a writeable compact disk (CD) or DVD, or a solid-state memory device. The memory 1806 may be, for example, firmware, read-only memory (ROM), non-volatile random access memory (NVRAM), and/or RAM, and holds instructions and data used by the processor 1802. The pointing device 1814 may be a mouse, track ball, or other type of computer (interface) pointing device, and is used in combination with the keyboard 1810 to input data into the computer system 1800. The graphics adapter 1812 displays images and other information on the display 1818. The network adapter 1816 couples the computer 1800 to the network.

As is known in the art, the computer 1800 is adapted to execute computer program modules. As used herein, the term "module" refers to computer program logic and/or data for providing the specified functionality. A module can be implemented in hardware, firmware, and/or software. In one embodiment for software and/or firmware, the modules are stored as instructions on the storage device 1808, loaded into the memory 1806, and executed by the processor 1802.

The types of computers 1800 utilized by an entity can vary depending upon the embodiment and the processing power utilized by the entity. For example, a peer device typically requires less processing power than a server used as a data center. Thus, the peer device can be a standard personal computer system. The data center, in contrast, may comprise more powerful server-type computers and/or multiple computers working together (e.g., clusters or server farms) to provide the functionality described herein. Likewise, the computers 1800 can lack some of the components described above. For example, a computer 1800 may lack a pointing device, and a computer acting as an edge network center may lack a keyboard and display.

Architecture—Server Infrastructure

Figure 6:
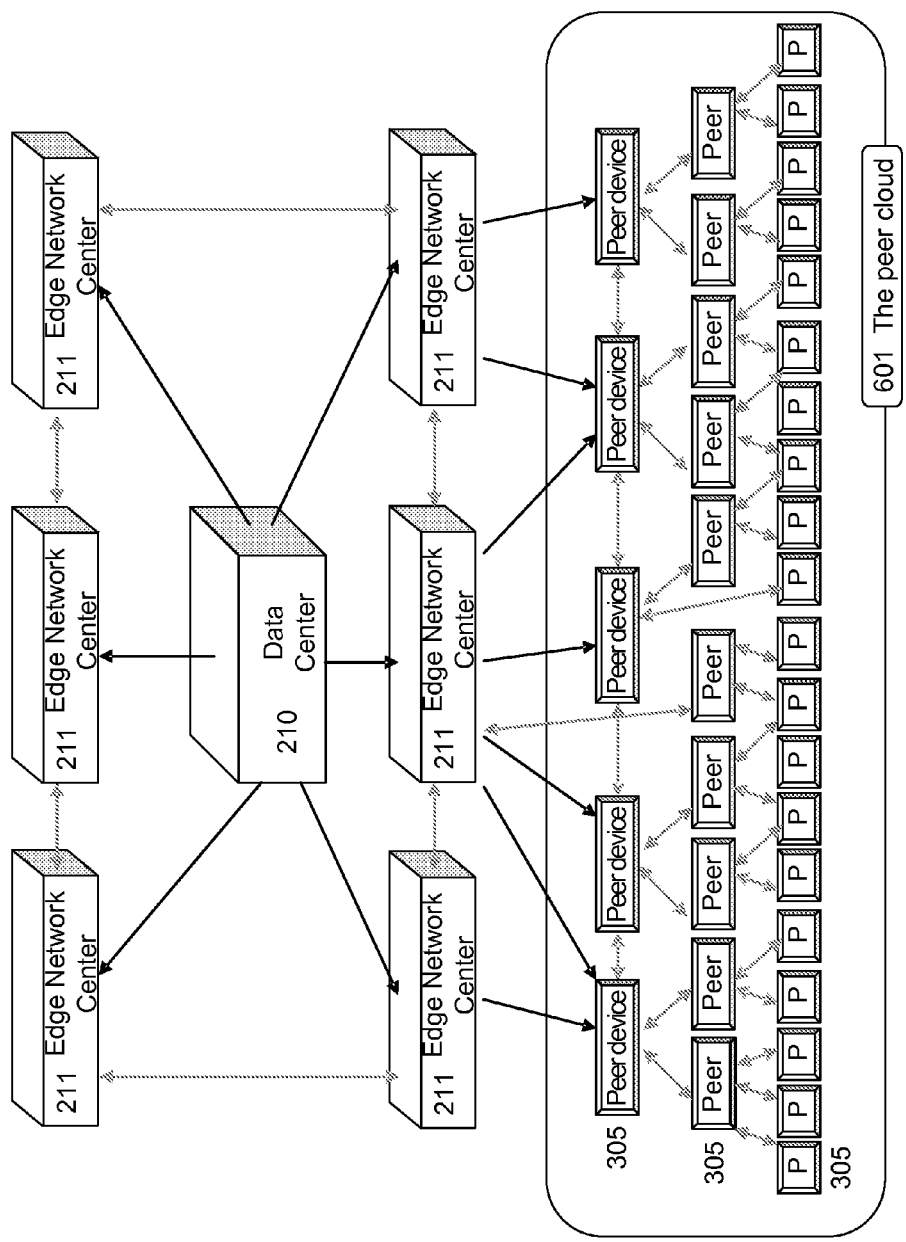
FIG. 6 illustrates one embodiment of the server infrastructure comprising servers and peer devices.

Turning back to FIG. 2, it illustrates one embodiment of the components in the server infrastructure 200. In one embodiment, the server infrastructure 200 includes a data center 210 and one or more edge network centers 220. The data center 210 communicatively couples each of the one or more edge network centers 220. The server infrastructure 200 forms the backend computing engine which serves data to the peer devices 305. It is also the point where information about the video is aggregated. It is possible to have multiple server infrastructures 200 deployed on the internet, each associated with its own unique domain name. The server infrastructure 200 as a whole includes information for operation of the system. It is possible to have some local information at each peer device 305 that is not a part of this central information. FIG. 6, described below, further illustrates the interaction between data centers 210 and edge network centers 211 and peer devices 305.

One embodiment of a data center 210 can have several components (also referred to as modules). The components (or modules) include a metadata web server 201, an upload server 202, an ad server 203, a tracker server 204, a transport server 205, a log server 206, a video database (a database is also referred to as a "DB"), and a device DB. A server in the context of a component such as log server or tracker server refers to a process running on a computer. In certain embodiments, multiple instances of certain modules may be present in a data center. The components metadata web server 201, upload server 202, advertisement server 203, tracker server 204, transport server 205, and log server 206 write/read data to/from the video DB 207 or device DB 209 and interact with components from other computers such as video uploader 212, video injection interface 213, advertisement networks 214, and device network 215. Additional details of the interactions of various components and functionality of each component are presented below.

The video DB 207 is a database that stores all the metadata information pertaining to videos. The metadata information can include general information, for example, title, description, and publisher of the video. It can include technical details about the video, for example, the bitrate, format, and duration of the video. It can also include log information, for example, how many times a video was played, when the video was played, and the peer devices that played the video.

The device DB 209 contains the information about peer devices 305. This information includes the technical information about the peer devices 305, for example, the operating system, current IP address, MAC (media access control) addresses etc. It also includes information about the list of videos cached at the peer device 305. In addition, the log of activities taking place at a peer device 305 is stored in the device DB 209.

The metadata web server 201 is responsible for gathering the metadata information about a video. The metadata information comes to the metadata web server 201 via a video injection interface 213. This interface could be an application that aids uploading a video file or an interface to a content management system that manages video content. The metadata web server 201 gathers video metadata and writes it into the video DB 207. When a web browser or peer device requests for the metadata of a specific video, the metadata web server serves the data as XML (extensible markup language) or HTML (hypertext mark up language) via HTTP (hypertext transfer protocol) or HTTPS (hypertext transfer protocol secured) protocols.

The upload server 202 interfaces with a video injection interface 213 as does the metadata web server 201. The upload server 202 receives the video data file and stores it into the video repository 208 of the respective overlay delivery node 212. The upload server reads video files of any format. The upload server 202 also interfaces with peer devices 305 when the peer device 305 needs to upload a video file to the upload server 202. The upload server 202 can transform the video file in many ways. For example, the upload server 202 can encrypt the video file or parse the video file to create an index of the video file that aids in the delivery process. The upload server is also capable of segmenting the video file into multiple video files each of which is made of a contiguous set of chunks from the original file. The upload server also is capable of uploading the entire video file, encrypted video file or any segmented video file to any content delivery server (CDN) 219.

The upload server also provides a way to integrate with CDNs 219. A publisher can configure an upload server to upload files to any CDN 219. The publisher specifies the FTP address, the username and password that will be used to connect to the FTP server and an HTTP(S) prefix of the URL at which the file will be available on the CDN 219 upon upload. The upload server also tracks the cost of delivering bytes out of a CDN 219 as well as the performance of the CDN 219. This information is used by the video delivery engine and the video controls manager to optimize the video delivery to minimize the cost incurred. The upload server also acts as a content management system (CMS) to the CDN 219 and provides functionality to add or delete video files from the CDN 219 as well as do other management activities such as checking the delivery limits or storage limits for a file or the account at the CDN 219.

The advertisement server 203 interfaces with an advertisement network 214 to receive advertisements in various forms from the internet. The advertisement server 203 can be configured to interface with a set of advertisement networks 214. The advertisement server 203 pulls in advertisements in different forms including static banners, text or video advertisements. The advertisement server 203 also retrieves metadata information about each advertisement and the list of keywords relevant to the advertisement. All this information is then stored in the video DB 207. If an advertisement is of the form of a video advertisement, the video data is stored in the video repository 208. The advertisement server 203 also receives requests from peer devices 305 to serve them with advertisements when requested. The advertisement server 203 receives requests via HTTP and HTTPS protocols. The advertisements stored in the video repository flow to the peer device just the same as a video file.

The tracker server 204 responds to requests from peer devices 305 for a query about locations that may store parts of a video file. A peer device 305 interested in playing a video, requests the tracker server 204 for a list of other peer devices, overlay delivery nodes 212 or external URLs from where the video data can be delivered. The tracker server 204 reads the video DB 207 and the device DB 209 to form a list of peer devices, overlay delivery nodes 212 or external URLs from where the video data can be delivered. The tracker server 204 also returns more information about each such device. This information includes, for example, the IP address of the device, the port and protocol to use to communicate with the device to retrieve the video file, and/or the cost per byte for download. In addition, this information may include any other data that will help the peer device 305 rank the device compared to other devices that can provide the same data.

The transport server 205 controls each peer device 305 and sends them instructions on tasks they need to perform. Each peer device 305 connects to the transport server 205 periodically and gets its list of instructions to execute. The list of instructions can include the video to be delivered, the video to be uploaded, a request to send log data, a request to send more housekeeping data etc. The transport server 205 connects to each peer device 305 over TCP (transmission control protocol). It can also receive and respond to HTTP and HTTPS requests.

The log server 206 receives requests from the peer devices when certain events occur at the peer devices 305. For example, if a user played a video on a peer device 305, the device will send a request to the log server 206 to record the event that the particular video was played on that particular device at that time. The log server 206 receives requests over TCP, HTTP or HTTPS and records the information into the device DB 209. Some of the information can also go into the video DB 207. The log server 206 can also respond to external requests from other web sites and content management systems (CMS). It can provide the feeds for the list of videos currently stored at any given peer device 305 or the feeds for all the videos in a given channel. A channel is a source of videos that a user can subscribe to, for example, a user can subscribes to a music videos channel from a video destination site to receive music videos.

Figure 2:
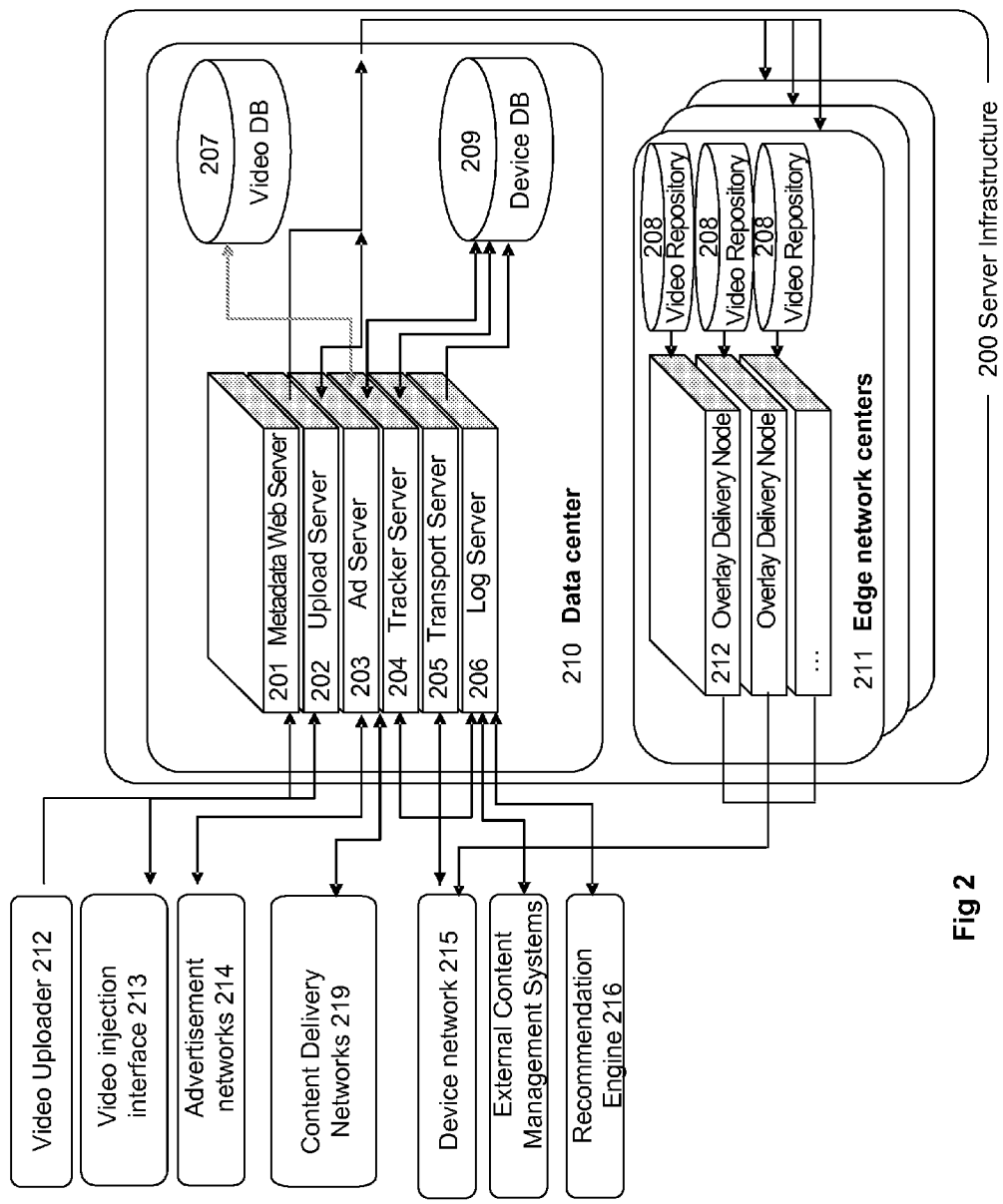
FIG. 2 illustrates one embodiment of the server infrastructure used for delivering videos.

The edge network center 211 shown in FIG. 2 can include one or more overlay delivery nodes 212 and one or more video repositories 208. The overlay delivery nodes 212 interact with device networks 215 and reads/writes data from/to the video repositories 208. Additional details of video repository 208 and overlay delivery node 212, their interactions and functionality are provided below.

The video repository 208 contains the actual video data file. This is the central and original location of all the videos in the distributed video delivery architecture. The video file in the video repository 208 is fetched by peer devices 305 via the overlay delivery node 212. Once the video file is copied over by a few peer devices 305, subsequent deliveries of the video file can take place from the peer devices 305 that already have a copy of the video. This repository could be part of the server infrastructure 200, or alternatively, could be available at the edge network center 211. As another alternative, the videos could be stored in a third party data center, a content delivery network (CDN) 219 or some other external location.

The overlay delivery node 212 retrieves videos from the video repository 208 and serves them to peer devices 305 that requested those videos. The overlay delivery nodes 212 can serve the video content in various protocols including, for example, p2p (peer-to-peer) protocols, HTTP, HTTPS, FTP (file transfer protocol), etc. The video file is divided into one or more video chunks 311 and the peer device 305 requests a set of video chunks at any given point in time. The video chunks are then put in the appropriate envelop based on the protocol used and transmitted to the requesting peer device 305. The overlay delivery nodes 212 run at an edge network center 211 which could be a data center 210 peered with a local ISP or can even be housed in a FTTC/FTTN/FTTB (fiber to the curb/fiber to the node/fiber to the building) or at a cellular (or mobile) network base station. The overlay delivery nodes 212 act as a way to boost the availability of videos when no other peer devices 305 are available or the available peer devices 305 are fully utilized. The overlay delivery nodes 212 could also be nodes or servers, that comprise, or be part of, one or more Content Delivery Networks 219 (CDN)s or alternatively, a overlay delivery node 212 could refer to a grouping of nodes or to an entire CDN 219.

Architecture—Video Delivery Engine

Figure 3:
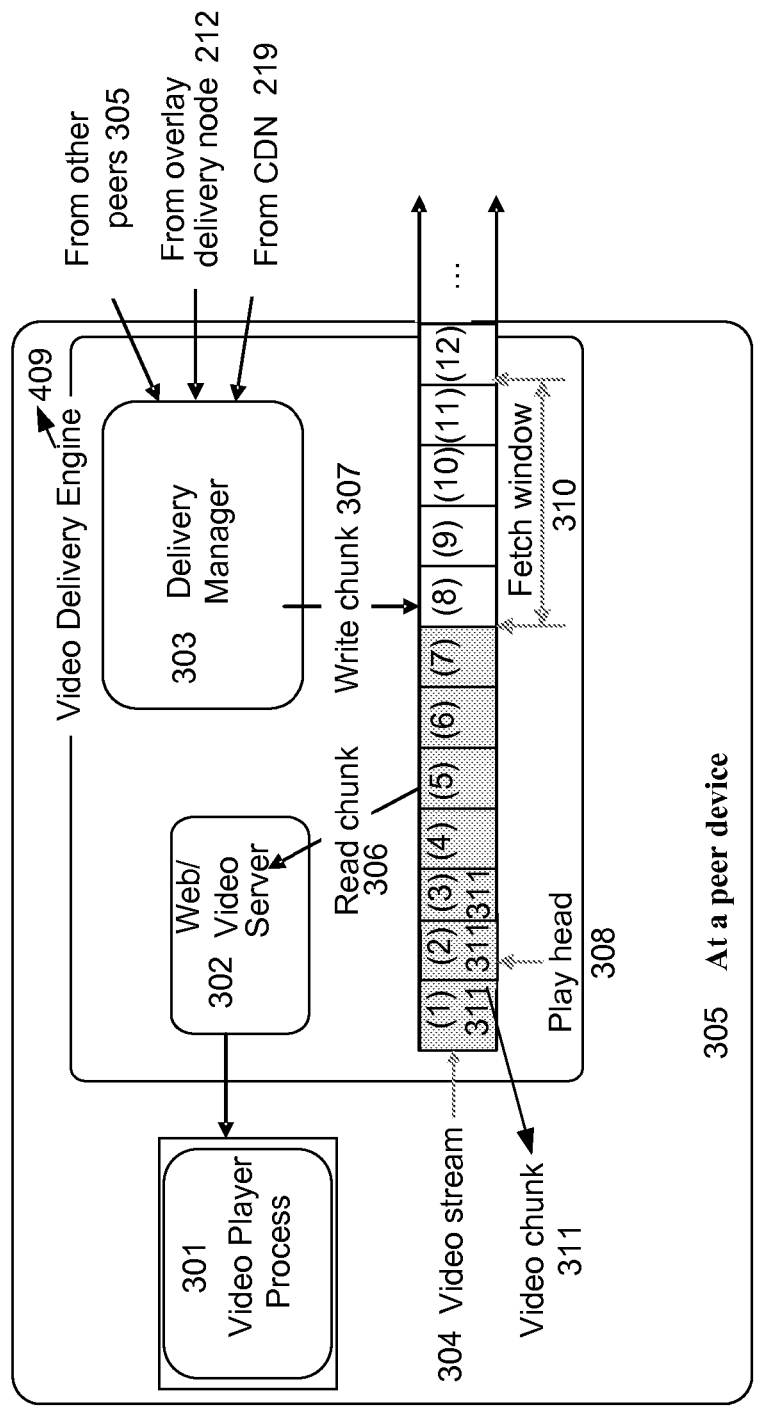
FIG. 3 illustrates one embodiment of the process of fetching video chunks at a peer device.

Referring next to FIG. 3, it shows the components of a peer device 305 including a video player process 301 and a video delivery engine 409. The delivery manager 303 receives video chunks 311 from other peer devices 305, overlay delivery nodes 212 and CDN 219 and writes the video chunks 311 to the video stream 304. The web/video server 302 reads the video chunks 311 from the video stream 304 and provides the data to the video player process 301 which plays the video. FIG. 3 also shows a fetch window 310 of four video chunks.

Figure 10:
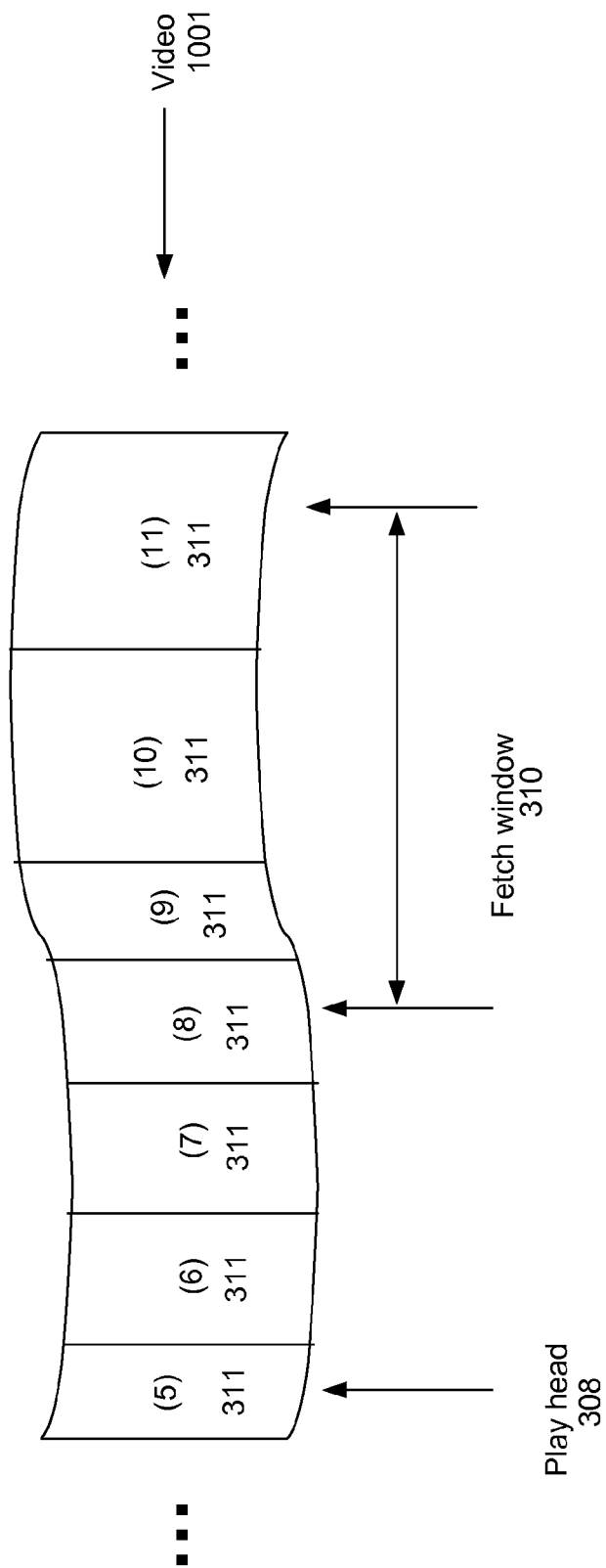
FIG. 10 illustrates a fetch window and play head position.

FIG. 10 described below, provides further details of a fetch window 310. FIG. 3 shows the play head 308 which is the chunk that is currently playing in the player. This is roughly the part of the video that is being rendered by the player, and likely the part of the video that is being viewed.

Figure 4:
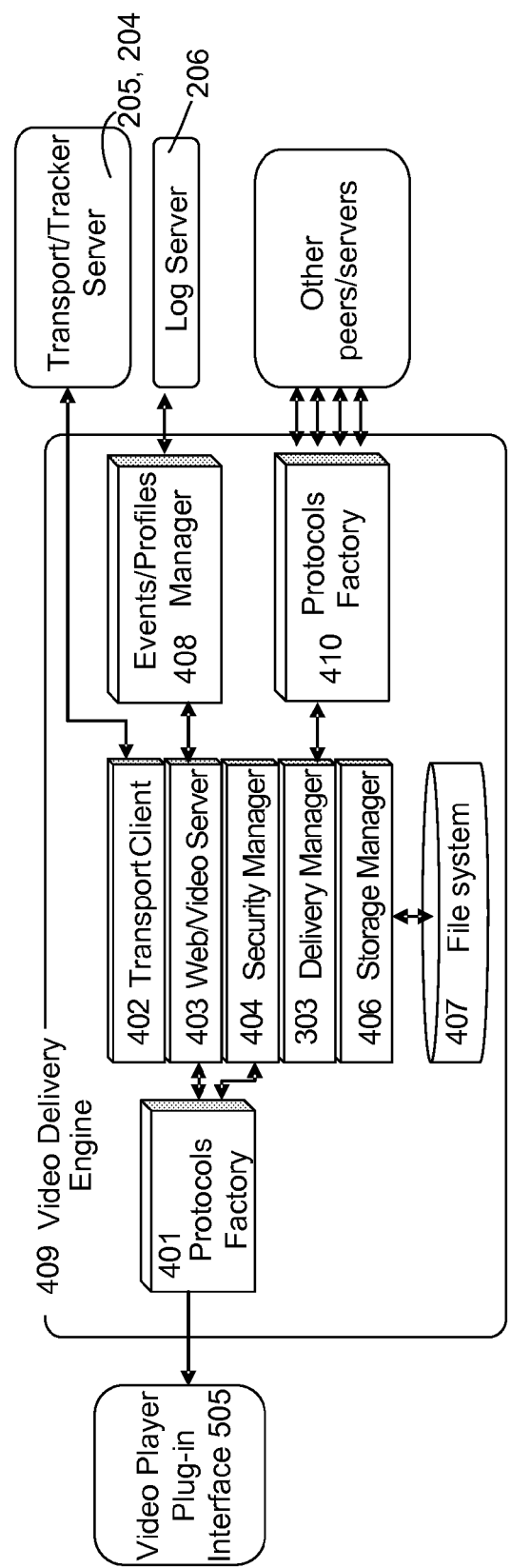
FIG. 4 illustrates one embodiment of the video delivery engine.

FIG. 4 illustrates one embodiment of the video delivery engine 409 running at a peer device 305. In addition, the peer device 305 may run the video player plug-in interface 505 for each media player on the peer device 305. An embodiment of a video delivery engine 409 comprises various modules including transport client 402, web/video server 302, security manager 404, delivery manager 303, storage manager 406, events/profile manager 408, protocols factory 401, and file system 407. The transport client 402 is responsible to connect with the transport server 205 and obtain (retrieve or receive) the instructions for the video delivery engine 409 operation. Based on the instructions it receives, the transport client 402 initiates a new video fetch or upload, starts serving an existing video to a neighboring peer device, dump the logs or receives new advertisements. The delivery manager 405 obtains (retrieve or receive) the video data from multiple sources including other peer devices 305, overlay delivery nodes 212 and the other content delivery network 219 (CDN) locations. The delivery manager 303 takes the help of protocols factory 410 to interact with other peer devices 305 and servers. The web/video server 403 serves the locally present video files or the received video data to the local video player 501 via the video player plug-in interface 505. The web/video server 403 is also capable of receiving HTTP and HTTPS requests from the video player process 301 and responding to them. The requests could be to return the status of a particular video being delivered, the metadata for a given video or to post an event back to the server infrastructure 200. The web/video server 302 takes the help of the protocols factory 401 to interact with the video player plug-in interface 505. The storage system provides an interface to the file system 407. The functionality of the various modules is further described below.

The security manager 404 is responsible to decrypt the video file received before serving it out to the video player plug-in interface 505. The security manager 404 is also responsible to authenticate the video player plug-in interface 505 so that the video delivery engine 409 only serves video data to known video player processes 301.

The storage manager 406 is responsible for the creation of a video file for storage as well as to reassemble all the video chunks that arrive from the delivery manager 405. The storage manager 406 abstracts out the location of the actual storage of the video data. The video data could be stored in the long-term storage (e.g., hard disk) of a device or in memory. Alternatively, the video file could be on a NAS (network attached storage) device connected to the peer device 305.

The delivery manager 405 also makes the decision on which source to pick for each chunk of the video. It receives feedback from the video player plug-in interface 505 on the current location of the play head 308. It calculates the speed at which the video chunks are being downloaded at any given point in time. It interfaces with the peer device hardware to know the available bandwidth at any given point in time. Based on all the information gathered, the delivery manager picks the appropriate bit rate and the source for the next chunk to be delivered. The details of the process that the delivery manager uses are specified further below.

The protocol factory 401 provides adapters for various protocols supported by the video delivery engine 409. The protocol factory 401 provides interfaces for HTTP, HTTPS, BitTorrent, FTP, RTMP (real time messaging protocol) and RTMPE (real time messaging protocol encrypted) protocols. In addition, it also supports the base protocol support for TCP and UDP (user datagram protocol). The protocol factory 401 provides the right adapters for the delivery manager 303 while receiving the video data from multiple sources. On the video serving side, the protocol factory 401 provides the protocol adapters for serving video files to the video player process 301.

The events/profile manager 408 records all the events triggered within the system and updates the profile of a peer device associated with the event. For example, when a new video is requested to download, an event is triggered that lets the events/profile manager 408 to record the fact that a request for that particular video was made. Based on the events recorded over a period of time, the events/profile manager 408 updates the profile for the peer device 305. This profile and events information is cached locally and periodically sent to the log server 206. Among other data, the events/profile manager 408 collects information about the list of videos delivered, the list of videos played, the time, duration and segment that was played etc. This information collected over a period of time allows the distributed video delivery architecture to interface with a recommendations system to receive recommendations for new videos based on the current profile of a peer device 305. Based on the specific recommendations, the transport server 205 sends commands to the specific peer device 305 to download certain videos that are highly likely to be watched on the device. In addition, this information is also used to deliver highly targeted advertisements to the peer device. Based on the device profile and analytics information related to an advertisement, the transport server 205 sends commands to the specific peer device 305 to download the advertisement.

Architecture—Video Player Plug-in Interface

Figure 5:
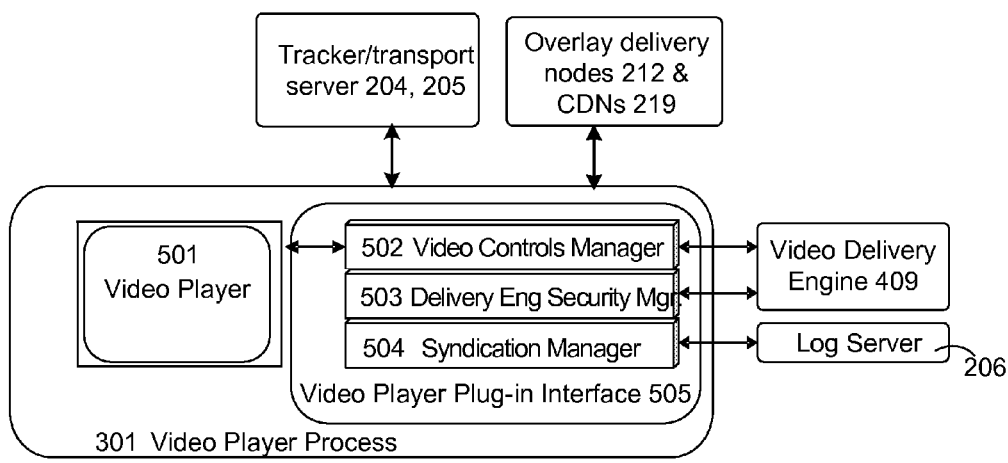
FIG. 5 illustrates one embodiment of the video player plug-in interface.

Turning to FIG. 5, it shows the components of the video player process 301 including the video player plug-in interface 505 and the video player 501. The video player plug-in interface 505 enables a video player 501 to retrieve a video from the video delivery engine 409 and play it. The video player plug-in interface 505 logs various events that occur in the log server 206. The video player plug-in interface 505 is specific to a video player 501 and comprises a set of APIs (application programming interfaces) written in a language compatible with the video player 501. For example, there are separate video player plug-in interfaces 505 for different commercially available video players 501. Examples of such commercially available video players include, but are not limited to, ADOBE FLASH PLAYER and MICROSOFT SILVERLIGHT player. In addition, there is a generic implementation of the video player plug-in interface 505 that works with the VIDEOLAN VLC player, WINDOWS MEDIA PLAYER, and APPLE QUICKTIME PLAYER. Other embodiments of the video player plug-in interface 505 plug into a browser like MICROSOFT INTERNET EXPLORER, APPLE SAFARI or MOZILLA FIREFOX. The video player plug-in interface 505 can also be integrated with custom video players developed by other developers or with an advertisement module that plugs into a video player 501. The video player 501 implementation calls the APIs of the video player plug-in interface 505 and sets up callbacks from the video player plug-in 505 to complete the integration.

An embodiment of the video player plug-in interface 505 is a software library that runs in the video player process 301 and is invoked by the video player process 301. For example, JW FLV player is an open source player that plays flash videos and can be embedded in a web browser. FIG. 16 shows screen shots of a JW FLV player with and without the video player plug-in interface 505. The overlay that appears in the second image which displays a message 1601 received from the video controls manager 502 requesting the user to install the video delivery engine 409. If the user installs the video delivery engine 409, the JW FLV Player gets connected to the video delivery engine 409. This is accomplished by the JW FLV Player calling certain APIs exposed via the video player plug-in interface 505. In certain embodiments, the video player plug-in interface 505 provides APIs for functionality including, for example: (1) Initiating a check for the video delivery engine installation on the local machine; (2) Passing a video file URL so that the video is delivered via the video delivery engine; (3) Passing through events such as play, pause, stop, seek etc. used by the video controls manager 502; (4) Providing callbacks to notify the player when a video file is ready to play; (5) Providing callbacks to notify the player of the progress of a video delivery. (6) Ability to connect to the tracker server and transport server to receive the list of video segment files for a given video. (7) Ability to pass the video segment files to the player in succession to affect a continuous playback of the entire video. The components of a video player plug-in interface 505 include video controls manager 502, delivery engine security manager 503, and syndication manager 504 which are further described below in further details.

Referring back to FIG. 5, the video controls manager 502 interfaces with the video player 501 to collect the user interface events received at the video player 501. For example, when the user requests to play a video, the video controls manager 502 sends a control message to the video delivery engine 409 to start serving the video via the web/video server 302. The video controls manager 502 is also responsible for obtaining non-user interface information like the position of the play head 308, for example, whether the video is stalled or if there was any error while playing back the video.

The video controls manager 502 sends the information it gathers to the video delivery engine 409. It also receives information on whether a given video is ready to play or is buffering from the video delivery engine 409. Accordingly, the video controls manager 502 can display appropriate messages to the user.

The video controls manager 502 is also responsible for triggering the installation of the video delivery engine 409 on a peer device 305 that does not have a video delivery engine 409 installed. The video player plug-in interface 505 is usually accessed via a browser as it is integrated into the specific online players on a web site. The video controls manager 502 detects if the video delivery engine 409 is installed on the peer device 305 via any of the browsers. If it fails the detection, it prompts the user to download and install the video delivery engine 409 as a plug in installation. The video delivery engine installation is a standalone process that runs as a background process, and is typically initiated along with system boot-up.

The video controls manager also is responsible to watch for cue points in the video where advertisements can be placed. The cue points are placed in the video data during the creation of the video file at a production studio or at a later point in time in the CMS. The video controls manager requests the video delivery engine to pick an appropriate advertisement based on the profile of the device and the list of advertisements available locally. In addition to video advertisements that play at cue points, the video controls manager can also place static banner ads and overlay ads as the video plays back in the video player.

The video delivery engine, when installed, serves HTTP requests at a specific port. The video controls manager 502 queries the video delivery engine 409 at the port to request for the unique device id for the peer device 305. If there is no response, the video controls manager 502 prompts the user for the installation. When the user installs the video delivery engine, the transport server 205 issues a unique identifier to identify this particular installation on the device as a peer. This identifier is the device identification (or identifier or id) of the peer.

Figure 15:
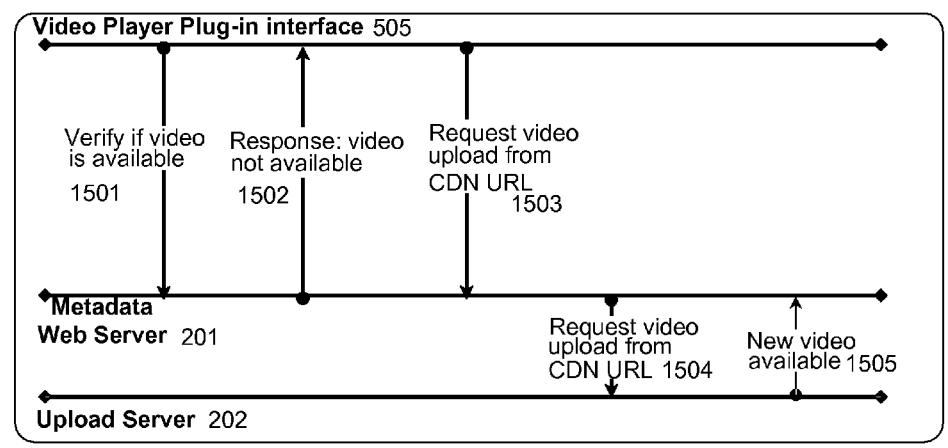
FIG. 15 is an interaction diagram illustrating one embodiment of the process of uploading a video from content delivery network.

Referring to FIG. 15, the video controls manager 502 is also responsible for verifying if the video to be played is available via the distributed video delivery architecture. The video player plug-in interface 505 queries 1501 the metadata web server 201 for the video. If the metadata web server 201 responds 1502 that the requested video does not exist, the video player plug-in interface 505 uses the URL (uniform resource locator) to the CDN 219 present in the video request from the video player to request 1503 the video. The metadata web server sends 1504 a request to the upload server to initiate an upload of the same video from the CDN URL into the distributed video delivery architecture. The upload server 202 informs 1505 the metadata web server 201 when the new video is available. Subsequent requests to the video by a peer device 305 are served from the distributed video delivery architecture.

An embodiment provides an application programming interface (API) that provides the capability to interface with existing content delivery networks, content management systems, and video players and the ability to collect and exchange information from above systems to update a device profile. Certain embodiments provide a set of application programming interfaces (APIs) that can be added to a video player, such as a flash player or an ADOBE AIR application, for example. The APIs perform a variety of tasks that include, but are not limited to, the following examples: (1) Prompting installation of a client and/or installation of a cookie at the device; (2) When a video player at a device initiates playback of a video using a video player, sending details of the video played to the cookie or to the client for recording; (3) Updating the device profile for the device; (4) Facilitating fetching/delivery of the video requested; (5) Facilitating forward-caching of other videos as per the forward-caching logic described; (6) Facilitating advertisement displays. The APIs are designed to facilitate inclusion in a player, with minimal integration with CMS (content management system) and no integration with a CDN 219.

Turning back to FIG. 5, the delivery engine security manager 503 is responsible for authenticating the video player plug-in interface 505 with the video delivery engine 409. The delivery engine security manager 503 does a challenge handshake authentication protocol (CHAP) with the video delivery engine 409 before the video player plug-in interface 505 can start retrieving the video data. The syndication manager 504 allows the user playing the video to invite his/her other friends to watch the video or to publish a post about the video on a popular social networking web site.

Next, FIG. 6 shows the flow of data and instructions between different kinds of servers and peer devices. As shown in FIG. 6, a data center 210 may communicate with one or more edge network centers 211. An edge network center 211 communicates with peer devices 305. In certain embodiments, a data center 210 may directly communicate with peer devices 305. The peer devices 305 obtain video chunks from other peer devices. Two devices connected by a bidirectional arrow in FIG. 6 can send video chunks to each other whereas a unidirectional arrow from a first device to second device indicates the ability of first device to send video chunks to the second device but not the other way. For example, a peer can serve other peers indicated by bidirectional arrows between peer devices. Similarly, two overlay nodes can send chunks to each other indicated by bidirectional arrows between overlay nodes. It is noted that an overlay node may be configured to only send chunks to peers and the peers would not serve the overlay nodes as indicated by unidirectional arrows from overlay nodes to the peers. The peer devices 305 form a network of devices communicating with each other called the peer cloud 601. The blocks shown in FIG. 6 marked "Peer device", "Peer" or "P" all represent peer devices 305.

As noted, a datacenter 210 could be represented by an origin server, a CDN 219, or a server. An edge network device 211 could be the same as an overlay node 212 ((An edge network center according to FIG. 2 has multiple overlay nodes). As also noted before, a peer device 305 could act as an edge network device or a overlay node.

It may be noted that, according to one embodiment videos could be stored at an origin datacenter that belongs to a publisher, represented by datacenter 210. Videos could be delivered from there to a plurality of peer devices 305. Further, there could be a CDN 219 being used, acting as an Edge Network Center 211.

Data Structures

Video metadata contains information about the video. Examples of video metadata within the context of the embodiment disclosed include title, description, publisher, original URL for the content, date the video was published, whether advertisements can be showed with the video and video data.

The video data usually comes in a file, is uploaded and stored as a file. When the video is served out of the overlay delivery nodes 212, the video is divided into chunks. The peer devices 305 read the video data as chunks from each other as well as from the overlay delivery node 212. Each chunk is designated by the offset in the video file where it comes from and the size of the chunk in bytes. This helps the peer devices 305 to request the chunk even from an external content delivery network 219 (CDN) URL as an HTTP range request.

The video stream metadata comprises the information that includes, by way of example: the bit rate for the video, the size of the video file, the play time of the video, the number of chunks in the video, the video reference file location for the video, the encryption key for the video file, the format of the video envelope, the encoding for video, the encoding for audio, and/or a video chunk descriptor.

The video reference file contains the reference information necessary for a peer device 305 to be able to find the other devices and servers which can deliver the video. Each video data file is divided into chunks before it is can be served by the distributed video delivery architecture. Also, based on how a video file is served the chunking is going to change. For example, if a video is delivered as adaptive bit rate, each delivered chunk of the video could have a different bit rate. So, the size of the chunk is also going to be different. If the video is delivered for a single bit rate, all the chunks could be of the same size. The video chunk descriptor gives the metadata associated with each chunk so that the chunk can be properly assembled into the video file at the delivery manager 405 of the video delivery engine.

The information included in the video chunk descriptor, includes, for example: whether the chunk is a video chunk or an audio chunk or a mixed chunk, the bit rate of the chunk in bps, the sequence number of the chunk in the video file, the offset of the chunk in the original video file, the size of the chunk in bytes, the sequence number of the first sample in the chunk, and/or a table of sizes for each sample in the chunk Both peer devices 305 and overlay delivery nodes can be termed as a peer. A peer is a device (either peer device 305 or an overlay delivery node 212) that can receive a video or serve chunks of a video. Moreover, a peer can do both functions at a given time in some instances. The tracker server 204 in the server infrastructure 200 tracks information about each peer device 305 on the list of videos it contains and other information about the peer that will be useful for a new peer wishing to receive video from it. The tracker server 204 to aids the video delivery process by keeping information about each peer, for example: the device ID of the peer, the latest IP address of the peer, the list of video ids served by the peer, the list of video ids received by the peer, the total number of distinct videos downloaded from the peer device 305, the estimated hop count of the peer device 305 to other peer devices it interacted with, the latest upload and download speed at the peer, the ISP id (ASID or Autonomous System Number of the ISP) if available (from P4P or Proactive network Provider Participation for P2P), the location (latitude/longitude) of the peer device 305 (based on a geo-location database), whether it is a peer device 305 or an overlay delivery node, whether the peer device 305 is restricted behind a firewall/NAT (network address translation) or is available on the internet, and/or the cost per byte to serve data from the peer.

Operation—Upload Video

With an understanding of the architecture set forth above, operation within it is now described. To begin with, a new video can be uploaded into the distributed video delivery architecture in a variety of ways. Examples are provided herein.

From Video Injection Interface:

A video can enter the system from a video injection interface 213 that is integrated with a $3^{rd}$ party CMS (content management system). The CMS has a video repository and exposes an interface (e.g. RSS or ATOM feed) to pull video into a video delivery system like the distributed video delivery architecture. The interface specifies ability to transfer video metadata along with the entire video file. The video file is transferred over HTTP(S) or FTP into the distributed video delivery architecture.

From a User Interface:

A user can upload a specific video into the distributed video delivery architecture via a user interface to upload videos. The distributed video delivery architecture provides a browser based user interface where the user can type in the video metadata and upload the video file from his local machine using HTTP(S).

From Video Player Plug-in Interface:

The video controls manager 502 of the video player plug-in interface 505 triggers an upload when a user starts playing a video that is yet not available on the distributed video delivery architecture. The video may have some minimal information including the video metadata and the CDN URL in the distributed video delivery architecture. When the user initiates a play, the video controls manager detects that the video is not available via the distributed video delivery architecture to delivery and invokes the CDN URL to receive it directly. Once the delivery is initiated, it sends a command directly to the upload server 202 to initiate an upload of the video from the CDN URL. This gives the video player 501 the ability to play the video immediately even if the video delivery engine 409 is not locally available. Once the upload is done, the video content becomes available on the distributed video delivery architecture. When the video player plug-in interface 505 is integrated as a browser plug-in, it gives it the ability to track every video that was played in the browser and optionally upload the video to the distributed video delivery architecture using the above process.

From the Video Uploader:

The distributed video delivery architecture provides an uploader which can be run on any internet connected device. User can configure a set of directories (folders), which will be scanned at a regular interval for new videos. Any new video will be published on the distributed video delivery architecture.

Once the video is uploaded, the video is made available in the video repositories of one or more overlay delivery nodes. The video could be optionally encrypted with a shared secret key. The video could also be optionally segmented into multiple video segments each of which is an independently playable video file. The optionally encrypted video file or the optionally encrypted segments can be published on various CDNs (content delivery networks) for distribution. Any such CDN 219 that hosts the video file for delivery to a peer device can be considered as an overlay delivery node from the perspective of the peer device. The URL to the video file in the CDN 219 goes into the video reference file as well. The process of segmenting a video file proceeds much like the chunking process for a video file. However, in the segmentation process, multiple contiguous chunks of the video are assembled, indexed and formatted to form a standalone video file that can be player in any player. The segmented video file plays a part of the video and has all the data necessary to play that part of the video. If all the segmented video files are played in the sequence they were segmented, the playback of the original video file is recreated.

Operation—Video Delivery Process

Figure 7:
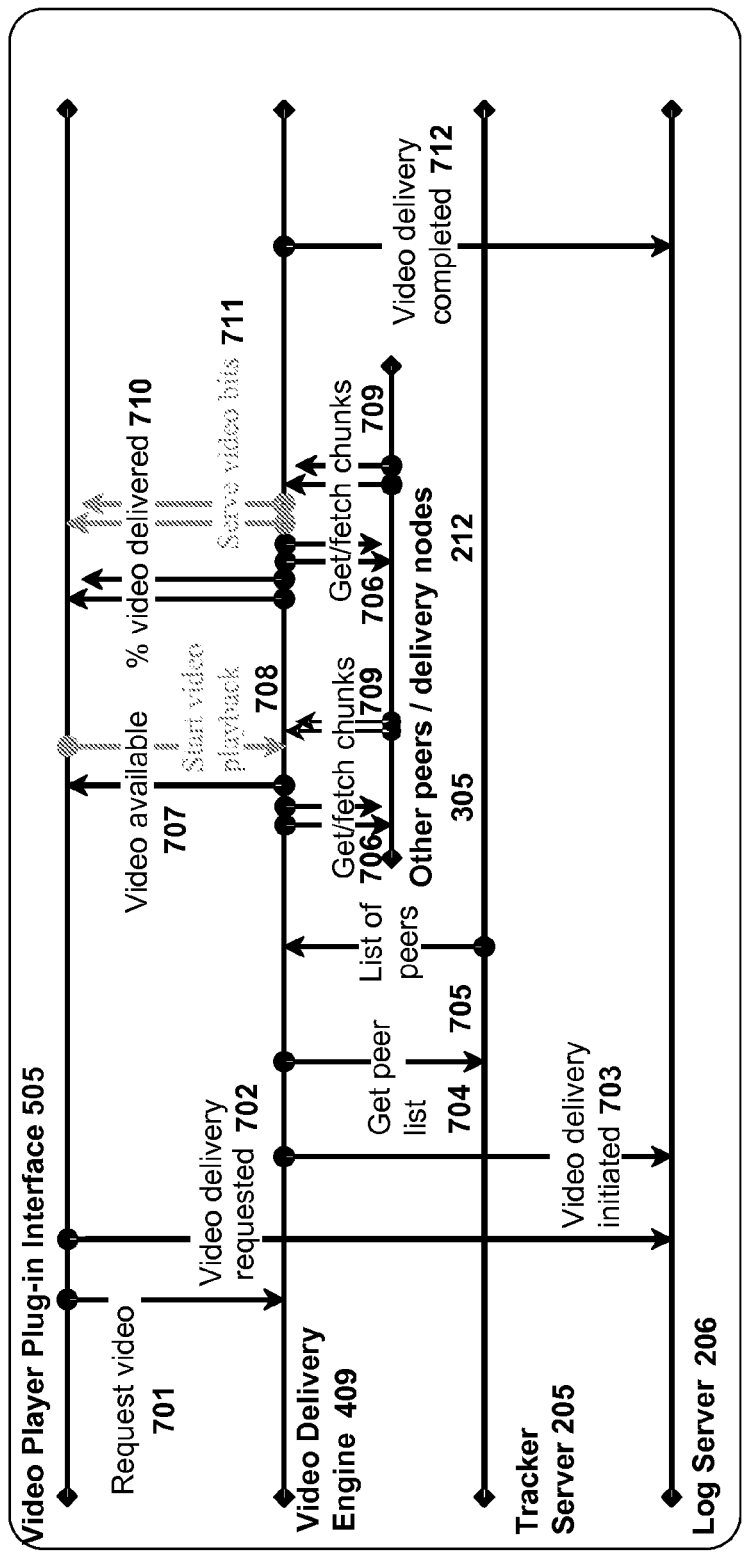
FIG. 7 shows an interaction diagram that illustrates one embodiment of the process for fetching videos.

Turning next to FIG. 7, it describes the overall data flow during a video delivery process. The video player plug-in interface 505 sends 701 a request to the video delivery engine 409 on behalf of the video player 501 to initiate gathering the video data for the video. The video player plug-in interface 505 also sends 702 a request to the log server 206 informing the log server that a request for a video is initiated. The video delivery engine 409 also sends 703 a message to the log sever 206 informing the log server 206 that video delivery is initiated. The video delivery engine 409 initially fetches the video reference file for the video that contains more information about the video to be fetched and where the video delivery engine 409 should connect to get the data for the video. In one embodiment, the location from where the video delivery engine 409 connects to get the data for the video is the tracker server 204. The video delivery engine 409 sends 704 a request to the tracker server 204 to get the list of available peers to get the video data. The tracker server 204 responds 705 with a list containing peer devices 305 or overlay delivery nodes 212 that have the video bits available and can serve data to this requesting peer. The video delivery engine 409 starts requesting 706 the peers for the chunks of videos and receiving 709 the video chunks. As soon as it receives the first chunk, it notifies 707 the video player plug-in interface 505 about the availability of the video. The video player plug-in interface 505 can initiate 708 a playback anytime after this notification. The video delivery engine 409 keeps notifying 710 the video player plug-in interface 505 about the progress of the delivery as well as sending 711 the video bits to allow a smooth playback at the video player 501. When the video is fully received, the video delivery engine 409 sends 712 a delivery complete event to the log server 206.

Figure 8:
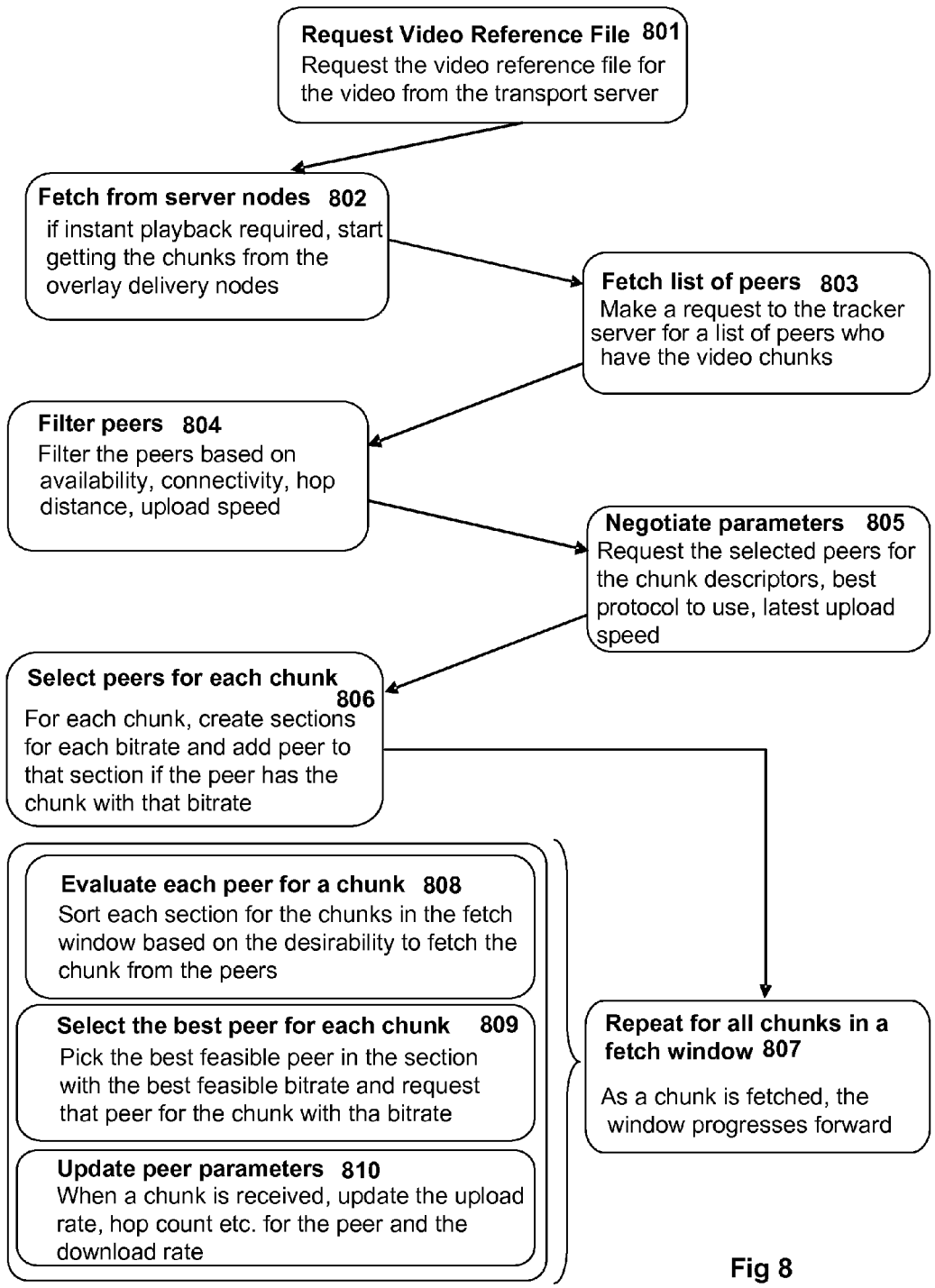
FIG. 8 shows a flowchart illustrating one embodiment of the overall process for delivering vides in a peer-to-peer network.

FIG. 8 provides an overview of the steps that the video delivery process goes through. The steps are described in detail below.

Request Video Reference:

When a user requests 801 to play a video, the video player plug-in interface 505 triggers the video delivery engine 409 to fetch 802 the video from the sources available. The sources for a video are peer devices 305 that already have the video and the overlay delivery nodes 212. Specifically, the video delivery engine 409 initiates the process of fetching the video by requesting the transport server 205 for the video reference file for the video. The video reference file has the basic information about the video including the tracker server URL that can provide the list of peers and overlay delivery nodes 212 that can provide the video chunks. The video deliver engine 409 creates (or builds) a list of the peers containing the video chunks corresponding to the complete video.

Fetch from Server Nodes:

As the video delivery engine 409 prepares to build the list of peers it needs to receive the video chunks from, it may start off by fetching 802 the initial few chunks from the overlay delivery node URLs in the video reference file. This allows the video delivery to start as soon as the request is received. This reduces the latency between the time the user clicks on the play button and the time when video playback starts. The overlay delivery node URLs received by the video delivery engine 409 contain the final IP Addresses of the overlay delivery node 212 instead of a domain name. This saves a request to the DNS Server to resolve the name to an IP Address. Also, the transport server 205 compiles the video reference file to have the overlay delivery nodes 212 that are closest to the requesting peer device 305. This helps in reducing the latency (or bitmile) in receiving the video chunks for the overlay delivery nodes 212. The chunks are delivered from the overlay delivery nodes 212 to the requesting peer until the peers to deliver the chunks are identified. Thus, zero or more chunks initially could be fetched 802 from the overlay delivery nodes 212 and stored in memory or on the file in the local requesting peer]

Fetch List of Peers:

The video delivery engine 409 fetches 803 a list of peers. Specifically, the video delivery engine 409 requests the tracker server 204 to provide it a list of peers from which to deliver the video chunks. One embodiment for a process followed by the tracker server 204 to return this list is as describe below:

Peer filtering at the Tracker Server:

When a peer device 305 requests the tracker server 204, the tracker server 204 filters 804 the list of peers and returns a list of peers that are most likely to respond fast to requests to serve the video chunks. From the comprehensive list of all peers that have the chunks for a given video, the tracker server 204 picks those that are, for example: (1) Not restricted behind a firewall/NAT and are accessible from the requesting peer device 305; (2) Belongs to the same ISP as that of the requesting peer device 305 (via any service that tracks the ISP for a device or by geographical location); (3) Has the least hop count to the requesting peer device 305; and/or (4) Has the highest upload bandwidth. The tracker server 204 uses the above guidelines to either filter 804 the peers or to order the list of available peers. For example, the tracker server 204 will eliminate any peer device 305 that is restricted from the list. The tracker server 204 will order the list of peer devices 305 in a descending order of the available upload bandwidth.

Peer Filtering at the Local Peer Device:

When the local peer device 305 receives the list of peers to deliver a video from the tracker, it filters the list and picks the peers that suits it the best based on steps including eliminating peers that do not have a route to the peer, may have a network address translation that will not allow communication from this peer etc. The peer device 305 has up-to-date information on some of its neighboring peers based on previous video downloads. This information is more accurate than the one obtained from the tracker server 204, especially on hop counts between the peers.

When the local peer device 305 receives the list of peers for a given video, it evaluates the list to reorder it. For example, the local peer device 305 first drops from the list the peers restricted behind firewall/NAT. Further, each peer device 305 is assigned a score based on a cost function. The cost function is evaluated using a set of parameters. The parameters include the upload speed at the remote peer, the hop count from the peer, whether the peer device 305 has the same ISP id as the local peer device, the geographical distance between the peer device 305 and the local peer device. Certain embodiments use the following function to calculate the cost C:

$$C=(c+c')\times h\times(2-i)\times(d/d_{max})$$

where c is the dollar cost per gigabyte (GB) transfer from the peer device and c' is a base cost, say, $0.001/GB and h is the hop count between the peers.

I is 1 if the two peers are in the same ISP domain and have the same ASID [Autonomous System identifier] and 0 otherwise.

d is the geographical distance between the two peer devices and $d_{max}$ is the maximum geographical distance between any peer device that has the given chunk and the local peer device.

This is a generic cost function applicable regardless of whether video is for immediate playback or for forward-caching.

The overlay delivery nodes 212 are listed in a separate list. The two lists are then sorted based on the score for each peer. The peers with the highest score are at the top of the list and indicate peers that are most favorable for downloading.

The cost function to be used in evaluating the peer list is adaptable based on the video being downloaded or the state of the local peer. When a video is being downloaded for immediate playback, the process may consider factors such as the cost function that will favor the upload speed at a remote peer device 305 over the number of hops or the geographical distance. When a video is being downloaded for forward-caching, the process may consider factors such as peers with shorter geographical distance, lower hop counts take precedence over the upload speed.

Negotiate Parameters:

The local peer device 305 picks each peer device 305 from the list in order and connects with the remote peer device 305 to negotiate 805 the best protocol to use for the chunk transfer. The peer device 305 gets back data about the current upload speed, and a rough estimate of the hop count between the peers. Also, the peer device 305 gets the information on what chunks are available at the remote end. The peers are contacted after the cost for the peers are evaluated and a peer device 305 gets selected as a candidate. The request to the peer device 305 is made in the order of the chunks received. The same peer device 305 is not requested more than once for different chunks. The request need not be selected based on whether the chunk is in the fetch window 310 or not.

Each protocol is assigned an order value. An order value of a protocol is a convention to prefer one protocol to another and is assigned by an operator. This provides a mechanism to control through named intervention which protocol to use. For example, if HTTP is given a lower order value than BitTorrent, HTTP will be preferred by the system. Typically, a protocol that has higher overhead in terms of bytes transferred and latency will tend to be assigned a high order value. This provides flexibility to configure the system to deter from using a protocol with higher overhead.

Each protocol has certain requirements for the two end points of communication. For example, HTTP transfer may work only if the server end is not firewalled. Same is true with FTP. BitTorrent may work only if both the local and the remote ends are not firewalled. The list of protocols available between two end points is filtered out based on the conditions of each of these peers. The local peer device 305 sends the list of protocols it can support given the condition. The remote end point receives this list and filters them based on the conditions at the remote end. Finally, from the list of remaining protocols, the protocol with the lowest order value is picked. The order value of each protocol is configured on the transport server 205. Once the protocol is picked, the necessary parameters for the protocol are exchanged, for example, for HTTP, the URL and the port (if different from port 80). The local peer device 305 then initiates the connection to the remote port using the chosen protocol.

Figure 9:
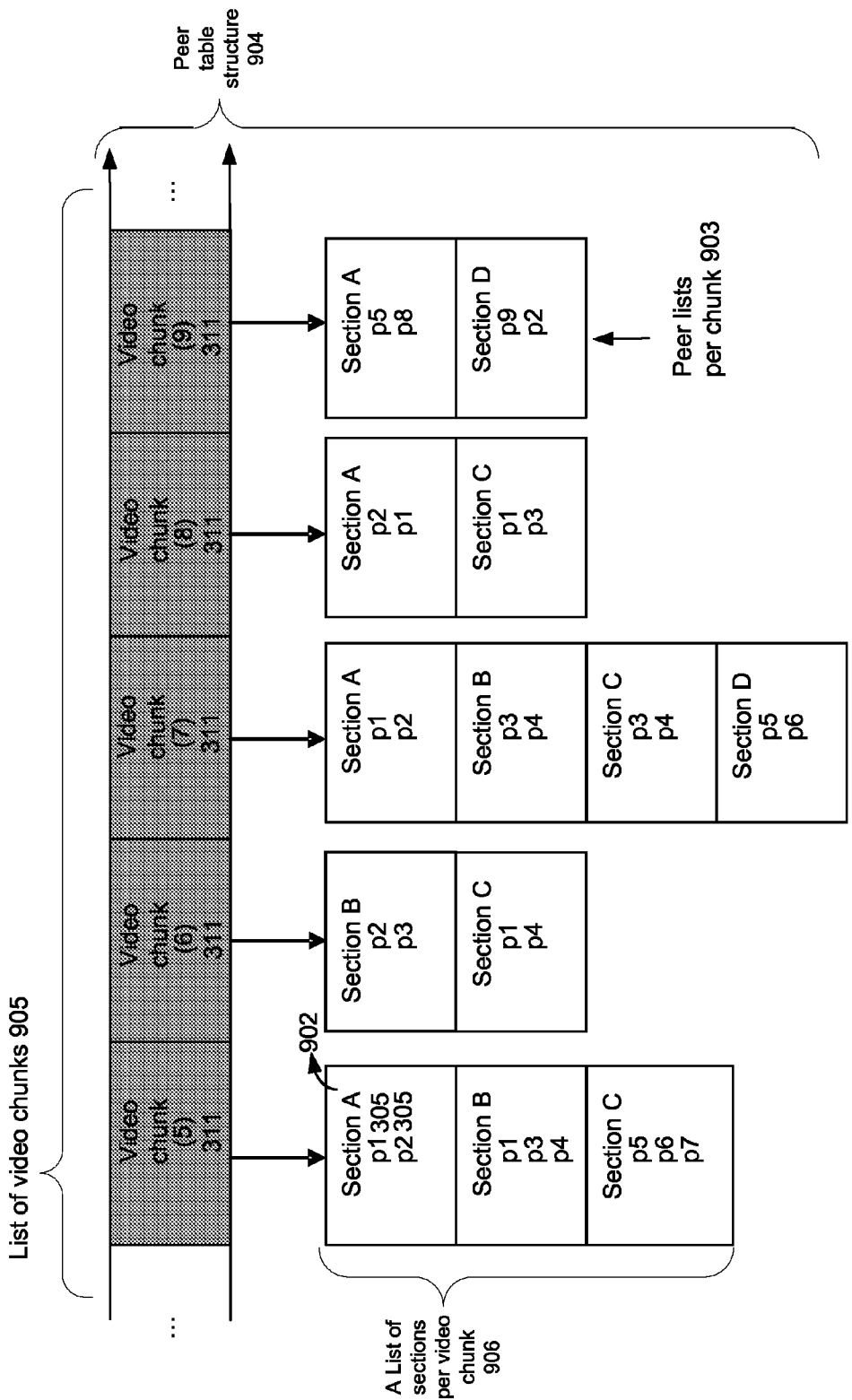
FIG. 9 illustrates one embodiment of the data structure used for representing an ordered peer list for each video chunk.

Select Peers for Each Chunk:

The remote peers are reordered based on the information gathered in the previous step. Using this, the local peer device 305 is able to build a table, for example, as illustrated in FIG. 9. For a given remote peer, the video delivery engine 409 has information about the list of chunks it contains, the various bit rates available for delivery of a chunk, and the sizes of each chunk. FIG. 9 shows the peer table 904 that has a list 905 of structures corresponding to each video chunk 311. The list 905 shown in FIG. 9 shows, for example, structures 908 corresponding to video chunks 311(5) through 311(9). The structure 908 corresponding to each chunk 311 has a list of sections 902. Each section 902 corresponds to a bitrate that the chunk is available in and has a list of ids of peers 305 that can deliver the video chunk 311 at that particular bitrate. For example, if chunk 311(7) is available in bitrates 5 Mbps, 2 Mbps, 1 Mbps and 300 Kbps from different peers, the video delivery manager 303 creates 4 sections, section A, B, C, and D, one for each bitrate. A peer id associated with a section 902 is indicated by pN, where N is an integer, for example, section A pointed at by video chunk 311(5) has a list of peer ids p1 and p2, section B pointed at by video chunk 311(5) has a list of peer ids p1, p2, and p3 and so on. A peer device may have a particular chunk available in more than one bitrates. The video delivery manager 303 selects 806 each peer that has a given chunk and adds the id of the peer to each section for each bitrate of chunk available at the peer.

After the peer devices are divided into sections, each section is sorted based on the desirability (minimization of cost function) with the lowest cost peer device at the top of each section. The sections are then sorted based on quality—that is descending order of the bitrates. In the above example, section for bitrate 5 Mbps will be above the section for bitrate 1 Mbps.

Since the video delivery engine 409 also knows the latest upload speed from the remote peer device and an estimated hop count, it can estimate the time it would take for each chunk to be delivered from the remote peer. The video delivery engine 409 can also estimate the cost based on cost function described earlier.

Scheduling Process for Video Chunks:

At any given point in time, the video delivery engine 409 is receiving video bits from its peers while playing back the video on the local machine. The play head 308 always lags behind the first missing chunk that is yet to be delivered. If the play head 308 reaches that chunk, the video playback stalls.

The goal is to avoid that and get as many chunks delivered as possible in the shortest amount of time in the order the chunks are played back.

As shown in FIG. 10, as the video is being fetched, the video delivery engine 409 keeps a window of chunks that is currently being delivered. For example, if the fetch window size is 4, the video delivery engine 409 will be fetching 4 chunks simultaneously. In FIG. 10, the video delivery engine 409 is fetching chunk 8 to chunk 11. As soon as chunk 8 is delivered, the fetch window 310 moves forward from 9 to 12. But if chunk 10 gets delivered ahead of chunk 8, the fetch window 310 remains at 8. When play head 308 coincides with the start of the fetch window 310, it gives the sufficient condition for a stall. To start with, the fetch window 310 is set to the number of peers available for the video. If the number is more than 5, the fetch window 310 is set to 5. The fetch window 310 is dynamically adjustable and changes during the course of the download.

As said earlier, the video delivery engine 409 contacts remote peers who are at the top of the list for every chunk to ensure that the remote peer device 305 is available and can serve the said chunk. The video delivery engine 409 contacts the remote peer device 305 to establish a connection well before the remote peer device 305 is requested for the chunk. If the remote peer device 305 is not available, the video delivery engine 409 goes down the list and finds one that is available. The video delivery engine 409 repeats 807 the following steps for each chunk in the fetch window: (1) evaluates 808 each peer device 305 for a chunk by estimating the time taken to deliver the chunk from the first peer in the first section for that chunk based on FIG. 9; (2) selects 809 the best peer device 305 to deliver a given chunk based on the peer table 904 in FIG. 9; (3) when a chunk is received, the video delivery engine 409 updates 810 the peer parameters stored locally including upload rate, hop count, and the download rate. If the video delivery engine 409 evaluates a peer device 305 for a chunk and estimates that the time taken to deliver the chunk may cause a stall, the video delivery engine 409 determines that using that peer device 305 for that bitrate is not feasible. So, the video delivery engine 409 moves down the list to the next peer device 305 to do the same evaluation 808. The first peer device 305 that qualifies the evaluation 808 will be used to fetch the chunk. When the video delivery engine 409 schedules a chunk to be delivered from a given remote peer device 305, that peer device 305 is removed from the list of available peer devices until the peer device has successfully delivered the chunk. The video delivery engine 409 contacts the tracker server 204 on a periodic basis while the download is in progress to keep track of any new peer device 305 being available for the download.

Meeting the Deadline

The above process forms the base process which will be modified to suite the different scenarios a peer device 305 may encounter. In certain embodiments, the download bandwidth at the local peer device 305 is greater than the video bit rate. As long as chunks are delivered at a rate faster than the playback rate, the play head 308 remains behind the fetch window 310 start pointer and things are good.

Base Case:

The Base case deals with the situation where all peers have all chunks and upload speed at each remote peer device 305 is more than the video bitrate. For example, if the fetch window size is w and there are more peers than w, the first w peers will be used to download the whole video. If w>the number of peers, p, the fetch window 310 will reduce top.

Upload Speed Restricted Case:

By way of example, some peers have upload speed that is slower than the video bit rate. Referring again to FIG. 9, it is understood that the best peer device to deliver a given video chunk. However, if the upload speed for the peer device is below the video bitrate, the likelihood of a stall increases. To offset this, the system may be configured to increase the fetch window 310 to offset the loss in bitrate or that chunk can be obtained from the peer device with the fastest upload speed that delivers the chunk. This decision can be structured as a runtime decision based on how far away the fetch window 310 is from the play head. If it is too close, the risk of a stall is much higher. If the time to stall is less than the time to download the chunk from the peer, the chunk is downloaded from the fastest peer (peers include overlay nodes). Otherwise, the chunk is downloaded from the remote peer device according to the table.

When the initial video chunks are being delivered, the video playback head is too close to the fetch window 310 start position and favors the delivery of chunks from faster and reliable sources such as the overlay delivery nodes 212 and the CDNs 219. This intuitive adaptation is one benefit outcome of the optimization being performed by the delivery process as disclosed herein.

Relaxing the Assumption on Local Download Bandwidth:

If the bandwidth at the local peer falls below the bitrate for the video, the play head 308 is likely to run into the fetch window 310 and the video will stall. This could also happen if the network connectivity between the uploading remote peers and the local peer is lost or some high priority process on the local peer takes excessive bandwidth away from the video delivery engine. In such cases, the video may stall.

The video delivery engine 409 prompts (via the video controls manager in the video player plug-in interface 505) the users at the first occurrence of the video stall and provides the user to either continue watching the video while they wait until the video buffers or to pause the download and move on to a different video. Alternatively, the user is also given an option where the video download continues in the background and the user is notified when the download is fully complete and the video is available to be watched in its entirety without any stalls.

When a chunk is being downloaded from a remote peer, the exact protocol used is decided based on the handshake between the two peers. The delivery manager invokes the right protocol using the protocols factory. This enables the video delivery engine 409 to playback a video whose chunks were delivered using any combination of p2p protocol over a p2p network, or HTTP(S) from a CDN 219 or overlay delivery nodes 212, or RTSP or other streaming protocols from a streaming server.

Adaptive Bit-Rate Delivery

A given video could be encoded with a few different bit rates. For example a video with original bit rate of 8 Mbps could be encoded in 8 Mbps, 4 Mbps 1 Mbps and 350 Kbps. In one embodiment, the system is configured to identify the highest bitrate encoding lower than the current download speed and stream that until the bandwidth changes again.

The video file encoded in a given bit rate is called an avatar for that video. For example, in the video described above, there are 4 avatars. Each avatar is parsed to divide the file into a set of ordered chunks. The number of chunks is the same in all the avatars for a video. However, the size of the chunk changes based on the avatar. An avatar with higher bitrate will have higher chunk sizes.

Each avatar is parsed to create the chunk descriptor file for the avatar. Each chunk descriptor is sent along with the chunk.

The peer devices 305 that already have the video could have chunks of different bit rate based on the download bandwidth available at that peer device 305 when it fetched the video. When a local peer device 305 makes a request for a video, to the tracker server, the tracker server 204 returns a list of peers. The local peer device 305 can then query the peers to get the list of chunk descriptors each of them have. The first chunk that contains the video headers (for example, for mpeg4 videos, this includes the moov atom for the video) is common for all the avatars. The local peer device 305 reads the first chunk and can create a local file for the video. This file will then be populated with the chunks that it receives from the remote peers. As soon as the first chunk is received, the client can serve a video player 501 and the playback can begin.

When the local peer device 305 receives the chunk descriptors from the remote peers, it can use the information in the chunk descriptors to create the table 904 in FIG. 9. Thus, it is possible that the same remote peer has 2 different chunks with a given sequence number k, one for a higher bitrate and another for a lower bitrate. In such a case, the local peer divides the peer list 903 for the chunk into different sections 902, each section associated with the peers for a particular bitrate. In FIG. 9, the peers 305 are indicated by the symbol pN, where N is a number, for example p1, p2, p3. It then sorts all the peers based on their desirability to fetch that chunk at the bitrate for the section. The sections are ordered such that the highest bitrate is at the top and the lowest bitrate section is at the bottom. Essentially, the highest bitrate chunk is most desirable. But, if the deadline cannot be met by the highest bitrate chunk, the lower bitrate chunk is delivered.

Once the peer device 305 fetches a chunk, it reads the chunk descriptor and figures out the offset in the local file to insert the chunk. This is a relatively easy computation described below. Each chunk received by the client could come from any avatar and hence, the size of the chunk is a variable. The delivery manager is able to accommodate the variable sized chunks. The delivery manager reads a chunk and the sizes of each sample within the chunk. Using the index table for the video (for example, for mpeg4 videos, the moov atom), the delivery manager locates the offset at which each sample needs to written from the chunk. It does this in a sequential manner until all the samples within the chunk are written to the video file.

The way a video file divided into chunks is as follows: Each video contains 2 tracks—one for video and one for audio. Usually, the video and audio data is interleaved in the video file. The video and audio samples are usually chunked as contiguous samples when interleaved. The process proceeds by finding these offsets within the file and creates chunk descriptors. Each chunk descriptor contains the track number (whether it is audio or video), the id of the first sample in the chunk and the individual sizes of each of the samples in the chunk. The samples are always in ascending order. In addition, the bitrate of this chunk is stored in the chunk descriptor. When the client receives a chunk with the chunk descriptor, it looks at the sample id and is able to find out the offset in the template file where it needs to copy that sample. This is done by looking up the index table for the video (for example, for mpeg4 videos, the moov atom) which contains the offset for each of the sample. Each sample from the chunk is copied on to the template file. Each chunk contains either audio samples or video samples, but not both. Hence the size of the chunks varies widely. Some chunks could be as small as 1000's of bytes and other could be as big as 100's of kilobytes (KBs).

Live Video Delivery

The examples described above focused on demand videos, e.g., stored videos that are available and served to users on request. Referencing live video, it is streaming from a streaming server. The start and end of a live video stream are undefined. When a user requests a live video, the video starts playback from the latest point the in the video and continues as long as the video stream lasts or as long as the user continues to watch it.

The distributed video delivery architecture described above and below supports the delivery of live video. The metadata about the live video which is similar to the metadata about an on demand video is published via the metadata web server. The video data itself comes directly from the origin server streaming the live video feed. The peer devices 305 access this video stream via the CDN URL in the video metadata.

When a user requests a live video, the transport client 402 on the video delivery engine 409 requests the tracker server 204 to return a list of peer devices 305 that are also receiving the same live video. If there are no peer devices 305 available, the tracker server 204 returns an empty list and marks the requesting peer device 305 as the generation 0 requester for that live video. For any subsequent requests for the same live video from new peer devices, the tracker server 204 can return a list with the generation 0 requestor. The tracker server 204 assigns a generation number to the peer device 305 based on the generation number of the peer devices 305 in the peer list returned. The requestor gets one number higher than the highest numbered generation in the peer list. For example, if a new peer device 305 requesting the live video was returned a peer list the highest generation number of 5, the generation number assigned to the requesting peer device 305 will be 6.

The generation number is used to assign peer lists for a given requestor. If a peer device 305 re-requests the list of peers from the tracker server 204 for any reason (the reasons could included a restart at the peer device 305 or some packet loss in the network) for the same live video, the tracker server 204 will ensure that the peer device 305 is returned a list of peers all with generation numbers lesser than the original generation number assigned to the peer device 305. This ensures that no cascading failures occur while delivering the video chunks from the peers. If no peers of lower generations are available, the peer device 305 is forced to request the video from the origin server (from the CDN URL). Also, it is worthy to note that the generation number assigned to a peer device 305 is specific to a particular live video. The same peer device 305 could be assigned a different generation number for a different live video.

Another aspect of live videos is that the fetch window 310 will be shorter than a typical on demand video. The reason is that only a few future chunks will be available at any peers at any given time. So, it is likely that the cost of delivering a live video tends to be more than that of an on demand video.

The basic process used by the above mechanism is similar to the base process presented earlier. The list of peers returned is filtered on the generation number in addition to the other parameters mentioned in the base process. The chunk sizes remain the same, but the fetch window 310 might be smaller. The reason to have multiple chunks being fetched from multiple sources increases the availability of the system that translates to a better experience and better video quality for the user.

Forward Caching

Another aspect of delivery optimization is forward-caching. Forward caching of a video is defined as the process of pushing a video into a peer device 305 that is highly likely to playback the video. The distributed video delivery architecture gathers events and other information about each peer device 305 to build a profile for the device. The system can integrate with a third party recommendations engine to get recommended videos for such profiles. Based on this information as well as some configuration parameters within the transport server 205, the transport server 205 instructs the peer device 305 to fetch certain videos. These videos are then made available to the user via a playlist associated with the video player 501. When the user requests the video, the video is already present in the local storage and can be played back.

Figure 11:
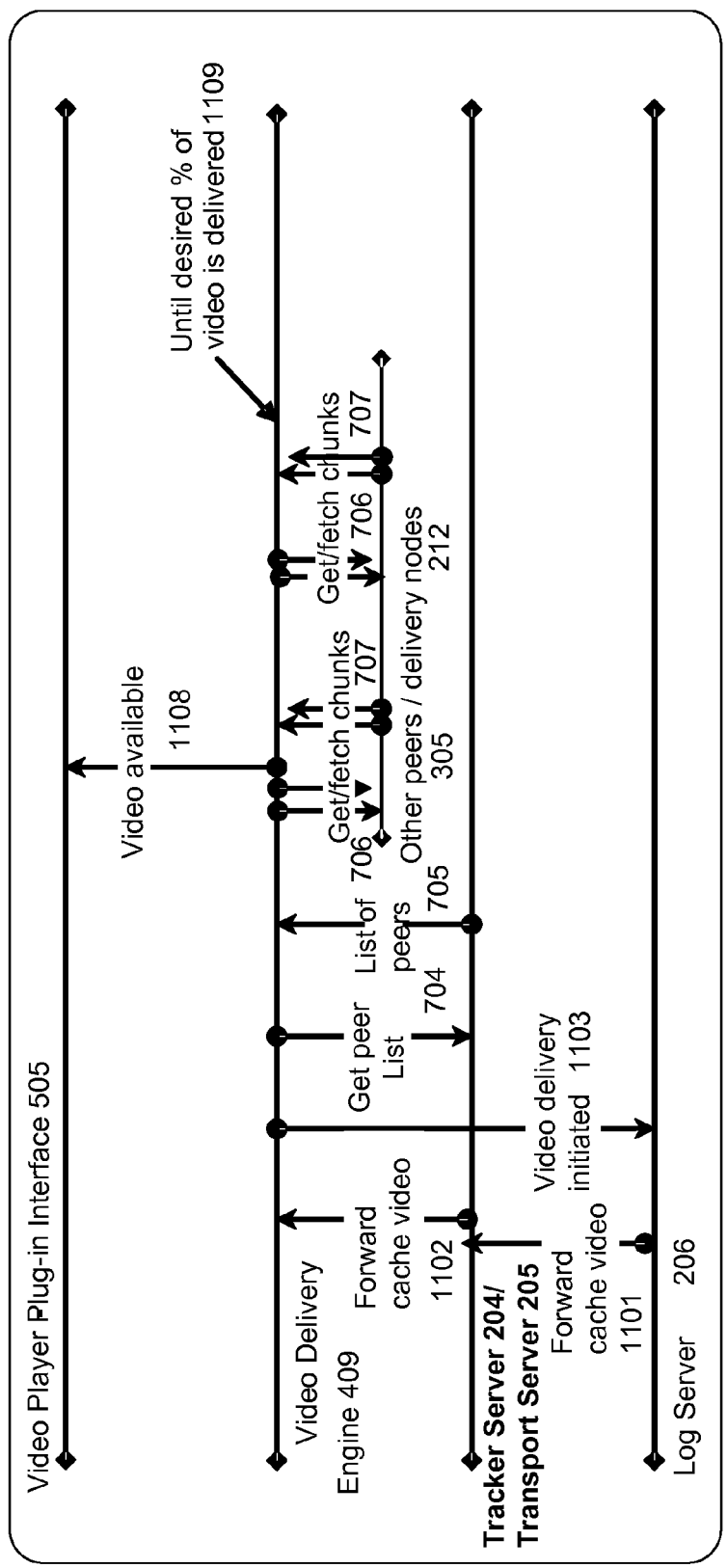
FIG. 11 is an interaction diagram illustrating one embodiment of the process of forward-caching of videos.

FIG. 11 illustrates the data flow involved during the forward-caching process. The data flow is described in the context of the log server 206, the tracker server 204, the transport sever 205, the video delivery engine 409, and the video player plug-in interface 505. The log server 206 sends 1101 a request to the transport server 205 to forward-cache a particular video to a particular peer device 305. The transport server 205 relays 1102 this message to the video delivery engine 409 from that peer device 305. This initiates the video fetch process. The video delivery engine 409 informs 1103 the log server 206 that the video delivery is initiated. The video delivery engine 409 requests the video reference file from the transport server 205, informs 1108 the video player plug-in interface 505 of the availability of the video, gets 704, 705 the list of peers available to receive the video chunks and gathers 706, 707 the chunks until desired percentage of video is delivered 1109.

While delivering videos that are forward-cached, there is no deadline for driving the delivery manager on the video delivery engine. This is because there is no player playing the video actively. This allows the delivery manager to keep the costs down and receive the video chunks only from those peers that serve chunks at the lowest cost.

Apart from fetching the video in its entirety for a forward-cached video, the transport server 205 can instruct the video delivery engine 409 to get only a part of the video rather than the full video. If the likelihood of the video being played back at the peer device 305 is lower but high enough that it be forward-cached, the transport server 205 instructs the transport client 402 to get a part of the video. In one embodiment, the part of the video delivered is from the beginning of the video. Chunks of video corresponding to a contiguous portion of the video are delivered until a desired percentage of the video is delivered. The amount of video forward-cached is based on the current download bandwidth at the peer device 305. If the download bandwidth is higher than the bit rate for the video only a small portion (typically 10%) of the video is cached. If the download bandwidth is much lower, the video is cached such that when the user starts the playback, the rest of the video can be downloaded at the download bandwidth and the user can watch the entire video without any jitters. In one embodiment, the amount of video forward-cached is computed as $(r-b)/r*100$ percent where b is the download bandwidth and r is the bit rate of the video.

Figure 17:
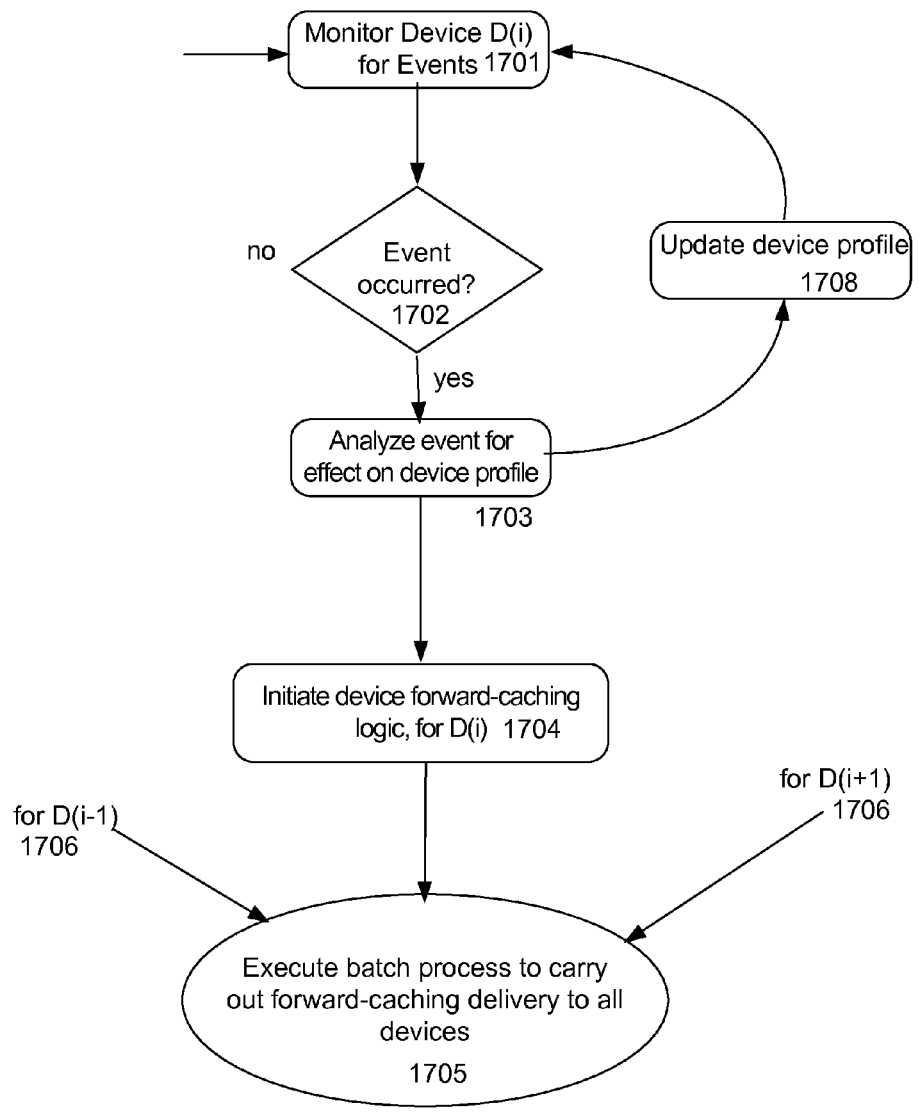
FIG. 17 illustrates one embodiment of the overall forward-caching process.

Referring now to FIG. 17, it provides details of an embodiment of a process for collecting information regarding a device that relates to likelihood of that device playing an existing video or a future video. This information includes, but is not limited to, videos played at that device and the timestamps of such playbacks, any repeat playbacks of a video at that device, any aborted playbacks at that device. The device DB 209 stores the list of videos and video chunks already residing at that device. This DB could be included as part of the system that stores the device profiles, optionally.

A device D(i) is monitored 1701 for occurrence of events. If an event occurrence is detected 1702, the event is analyzed 1703 for its effect on the device profile. The device profile is updated 1708 based on the analyzed effect of the device profile. Events are collected that could change the likelihood of the device playing a video in the future. Such events could include, but are not limited to any new video played on that device, any other information that can be gather about the usage of the device (such as other cookie updates), information on behavior of other (similar) devices, and any information provided by the user that directly shows the user's interest in a set of existing or future videos. It would also include the occurrence of events that may not directly result from device behavior such as publishing of a new video, changes to recommendation systems that the system interfaces to.

The step 1704 comprises initiating a forward-caching logic, usually accompanied by the occurrence of an event and/or updates to the device profile. A batch process is carried out to execute 1705 the forward-caching delivery to all devices. The forward-caching logic checks for any explicit or implicit subscription to a channel, to video groupings, among other things. Based on the forward-caching logic, and using the device profile, the system calculates the likelihood that the device would consume any of the existing videos and of any new videos that have been published. Next, in consideration, with the amount of storage space available for the purposes of forward-caching at that device, the bandwidth observed at that device, the current device profile, and the video characteristics, this logic recommends forward-caching of a video, or parts of a video, to that device, along with a confidence/prioritization measure attached to such recommendations. The confidence measure, includes among other things, the confidence in the prediction that a video. The recommendation could also include deletion instructions for a video/video chunk, at a device. This information is then sent to the forward-caching delivery logic engine.

The delivery engine forward-caches videos out to a set of devices by considering a variety of factors. These factors include, but are not limited to, for example: (1) Predicted cost of delivering the chunk, via the various possible video sources; (2) Changes in the predicted cost of delivery over a time horizon; (3) How soon the user of the device is likely to request consumption of the video; (4) What other devices would need the same video (or video chunk); (5) Information based on the device profile itself, such as, likelihood that the device would be online over a time horizon; and/or (6) Whether the delivery engine will also delete video (chunk) already cached in that device based on the above factors, as per the forward-caching instructions.

Example of Forward Caching

Referring now to an example of how the system would work for forward caching. Presume a computer (or alternatively any IP-connected device with some storage capability), D has a video delivery engine component 409 installed, with a profile D_p. Further, assume that the storage space, of size S (=3 GB) is available for forward-caching. The device profile of D shows that videos v_p, v_q and v_r have been played. Now say, an event occurs: a content publisher has published a new video, v_s The system analyzes whether this event (publishing of v_s) affects D_p, and if it does, how it affects it. Assume that v_q and v_r are consecutive episodes of a TV show and that the user had seen those episodes in sequential order. Then the analysis would indicate that there is a probability that D would be interested in v_s. One way to calculate the probability is as a function of number of previous episodes viewed. Hence, if v_q was also part of this episodic series, then the probability arrived at, would be higher.

Now, the analysis would look at how much space is left in S, and how much space would v_s take. It would also consider how many other videos D have played and how much space may be needed to keep for other videos that may be relevant for D based on subsequent events. It determines whether videos in D may no longer be required, either because a particular video has been played, or because the likelihood that a particular video may be played may not be high, or because the value in keeping a particular video stored in D is not as high (for example, say the cost of getting it subsequently is relatively lesser).

Based on the analysis above, this step in the system concludes whether it would be worth delivering v_s to D, and furthermore the importance of delivering v_s. Further, an indication may be made as to what chunks (or parts) of v_s are more important to send to D. In one embodiment, the initial parts of v_s may be sent.

In addition, this step may also indicate the "urgency" of sending v_s to D. For example, it may be sufficient to send v_s to D before the weekend. Alternatively the publisher of v_s may want the videos to be delivered by a certain future date. A conclusion may be made that other videos (or chunks of videos) already present in D could be deleted. These details are passed on to the device forward-caching process.

This process would consider the aggregate of devices that would be interested in v_s (or chunks, thereof) and decide upon a good way to accomplish the delivery. This good way may be dependent on the availability of v_s (or chunks, thereof) from different sources, the relative cost of using different protocols to accomplish the delivery, the time it would take to accomplish the delivery from the various options in terms of source and protocol, the way the cost of delivery varies over a time horizon, the urgency of accomplishing the delivery, as well as existing activity and traffic on the network.

As an example, consider if the video v_s (or parts thereof) needs to be sent anytime over the next 3 days. The system may decide that it would deliver the first predetermined portion (or percentage), e.g., 5% of v_s immediately, and then deliver another portion, e.g., 30%, over p2p, and a further portion, e.g., 25%, delivering over http from certain hosted servers, at certain parts of the day would be optimal. It would also decide that the remaining portion, e.g., 40%, would not be delivered until the point the user requests the video, either because of storage space constraints or as a way to keep space available for other videos.

The transport process would accomplish the delivery, and any accomplishments are updated in the device database. The transport server 205 oversees the chunks exchanged by the peers and is capable of initiating or terminating any specific peer interaction. This allows the transport server 205 to optimize the performance of the distributed video delivery architecture as a whole. The transport server 205 analyzes the distribution of video data across the network and can determine if a particular video needs to be pushed or forward-cached to a particular peer (including an overlay delivery node) so that future delivery of the video for peers in that neighborhood can be more efficient. This is achieved by running collaborative filtering on the popular videos and high throughput peers.

Video Playback Process

When a user wants to play a video, the user clicks on the play button of the video player 501. This triggers an event in the video controls manager 502 in the video player plug-in interface 505. The video controls manager invokes a request to the video delivery engine 409 via the web/video server 403 component.

The web/video server component checks to see if the video is available in the local storage in the local file system 407. If so, the web/video server reads the file, optionally decrypts the video and serves the video data to the video player 501. If the video is not available in the local file system, the web/video server initiates a request to the server infrastructure 200 via the transport client 402 component. This initiates the video fetch process described earlier. As the first chunk of the video becomes available, the web/video server starts serving the video player 501.

The video chunks received as well as the video data stored in the local file system is encrypted. A video publisher can choose to not encrypt a file in which case the video will be stored and transmitted in the clear. Otherwise, the video data is transmitted and stored in an encrypted form. The decryption of the video data can either happen at the security manager 404 in the video delivery engine 409 or at the delivery engine security manager 503 in the video player process 301. Exactly where the decryption happens is negotiated between the video player plug-in interface 505 and the video delivery engine 409 and depends on the capabilities of the video player 501. For a player such as ADOBE FLASH player, the decryption happens on the video delivery engine 409 where as for an advanced player such as ADOBE AIR player, the decryption happens in the video player process 301.

The capability of the video delivery engine 409 to store the video file and the associated metadata in the local file system enables it to perform as an offline system. A user can launch the video player 501 and can continue to watch the videos that are stored in the local file system without ever having to connect to the server infrastructure 200. The events that are triggered while watching the videos offline are cached and synchronized with the server infrastructure 200 when the video delivery engine 409 regains connectivity to the server infrastructure 200.

In one embodiment, the video player plug in receives the video reference file directly from the tracker server and retrieves the list of video segments that make up the video. For each video segment, the tracker server returns a list of URLs where the segment is available from and the cost and performance metrics to deliver the video segment from the particular URL. The video controls manager implements the optimization algorithm to fetch the segments from the least cost URL while maintaining a continuous playback of the video. The cost optimization algorithm described in the above section is implemented in the video controls manager. Instead of doing the optimization at the level of each video chunk, it is done at the level of a video segment, each segment being an independently playable video file. In this embodiment, the video controls manager bypasses the video delivery engine and retrieves the video segments directly from the overlay delivery nodes 212 (including CDNs 219).

One of the metrics to determine the performance of an overlay delivery node is the time to first byte, which is the time it takes to deliver the first 1 Kilo byte of data to the requestor since the request was made. An overlay delivery node that has a shorter time to first byte is said to perform better than the one that has a longer time to first byte.

Typically, a video player is instantiated in the user's browser when the user visits web page that has the video player embedded. The link that launches the embedded video player could come from the metadata web server. The metadata web server receives a request from the user's browser to launch a particular video using the embedded video player. The metadata web server uses the device database and the device's current IP address to find the best URLs to fetch the video segments. The metadata web server passes a list of URLs for each segment of the video to the video controls manager via the web page. This allows the video controls manager to start receiving the initial video segments from these URLs even before it invokes the optimization process.

This allows the video player to start the playback of the video as soon as the video player launches. The list of URLs passed by the metadata web server is picked based on the distance between the IP address of the requesting device and the available overlay delivery nodes including the CDNs 219 that can serve the segments of the video. The metadata web server picks the URLs that are closest to the device's IP address provided the time to first byte is below a threshold value or the speed of delivery is above a threshold speed.

Adaptability to Consumer Electronics Device

In one embodiment, the video player plug-in interface and the video delivery engine executes on consumer electronics devices that have a networking and storage capabilities. Examples of consumer electronic devices include portable media players, smart phones, mobile phones, automobile video systems, specific consumer design products incorporating functional aspects disclosed herein and the like. Many of such consumer electronics devices implement the video player functionality in hardware and firmware. The video player plug-in interface in such cases is integrated with the video delivery engine and they together run as a single process.

The consumer electronics device user interface provides controls for the user to switch from one video to another or to start and stop a video. As in the case of a software based player, when such events occur, the video player plug-in running in conjunction with the video delivery engine gets callbacks notifying that a video event has occurred. The behavior of the video player plug-in interface remains identical to the one described earlier.

Video Serving Process

When a peer device 305 finishes receiving a video or is in the process of receiving a video, it can also serve the video chunks 311 it has acquired to other peers. The details of which video and which chunks of a video are present at the peer device 305 are available at the tracker server 204. The peer devices 305 query the local peer device 305 for those video chunks 311.

The local peer device 305 keeps a measure of its upload speed based on the speeds it obtained on the recent video chunks it served to other peer devices 305. This upload speed is available at the tracker server 204 as well. When a peer device 305 requests the local peer device 305 to serve a particular video chunk 311 or a set of chunks, the two peers calculate the hop count between them and the recent data transfer rate between them. If there is no information available on the recent data transfer rate, the most recent upload speed is used. Otherwise, the minimum of the most recent upload speed and the recent data transfer rate between the peers is used. This is the upload speed that the remote peer device 305 will use in its calculation to pick the appropriate peer for the video chunk 311.

The peer device 305 can also rate limit the upload bandwidth to some percentage of the total upload bandwidth available. In such case, the upload speed reported to the remote Peer will be the percentage of the total upload bandwidth. Also, when the peer device serves chunks to the remote peer device, it will throttle the bandwidth to that value.

The local peer device receives an incoming request from a remote peer device and if it has served one or more video chunks 311 to that peer device, it is likely that the local peer device 305 will continue to serve more video chunks 311 until that remote peer device 305 has received the entire video. A connection made by the remote peer device 305 is kept open until the remote peer device 305 closes the connection. At any given point in time, the local peer device 305 only serves video chunks 311 to a limited number of remote peer devices 305. Thus, a response time to deliver a packet is very close to the round trip time of the request and the time it takes to deliver the video chunk 311 at the upload speed. This also increases the chance that a request for video chunk will find the network available.

The local peer device 305 also can preempt a request it is already serving to favor a new incoming request. Consider a local peer device 305 that is already serving requests and can no longer accept any new requests. If the local peer device 305 was serving chunks to a video that was being forward-cached while it receives an incoming request to serve chunks for a video that is being played back at the remote peer device, the local peer device 305 will terminate the forward-caching request in favor of the new incoming request.

Process of Updating the Profiles

Figure 12:
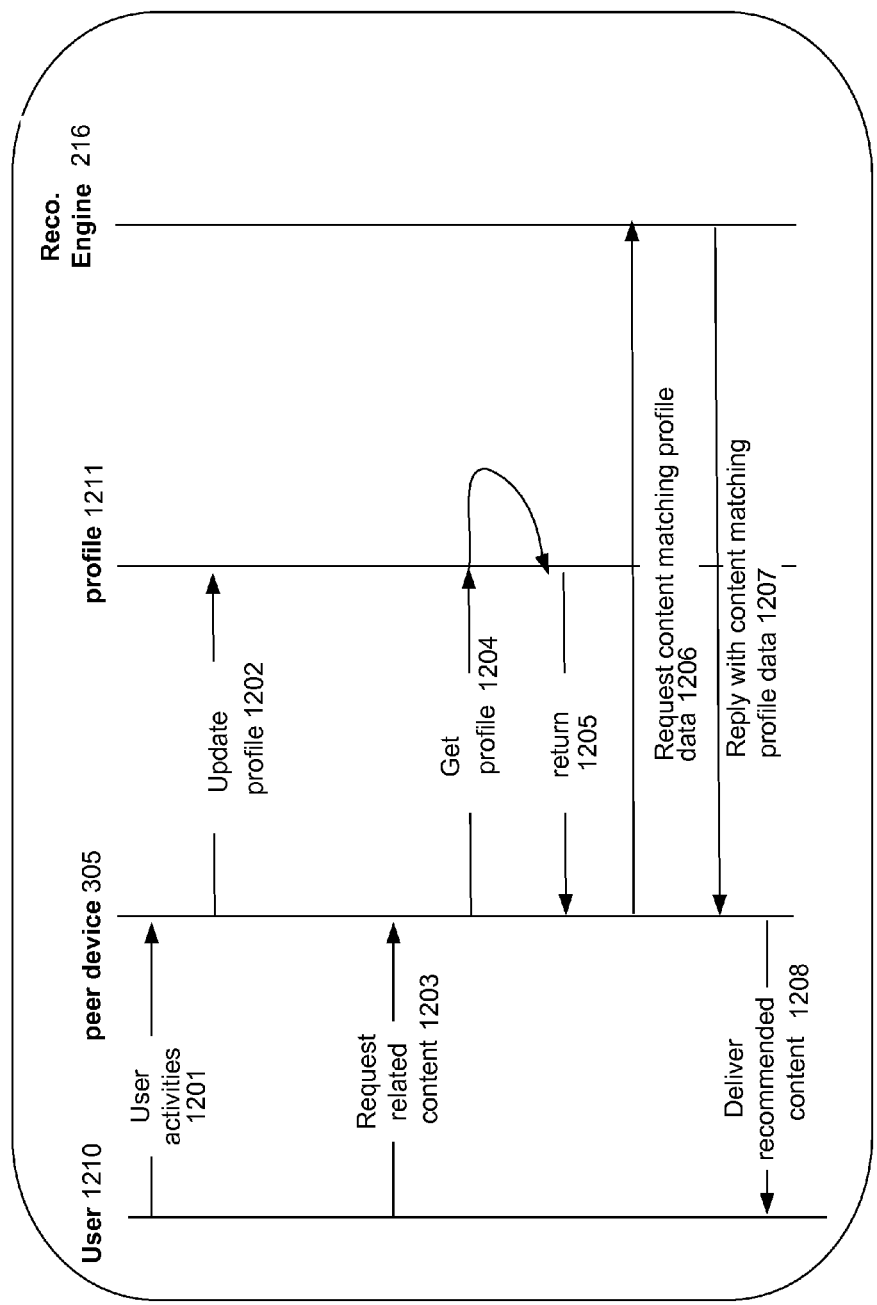
FIG. 12 is an interaction diagram illustrating one embodiment of the process of profiling data for forward-caching of videos.

Turning to FIG. 12, a peer device 305 profile is maintained to gather data on the kind of content consumed by a user from the peer device 305 so that the system can recommend relevant videos based on this information. The content can include user activities 1201 including web pages visited by the user, music that was played on the computer or videos that were watched, but is not limited to these. The gathered data is processed to create or update 1202 a compact profile about the user behavior which is continually updated as the user consumes more content. The user 1210 requests 1203 the peer device 305 to recommend content. The peer device 305 sends a request 1204 to get a profile and receives 1205 the profile. The peer device 305 requests 1206 the recommendation engine 216 to provide content matching the user profile and the recommendation engine 216 replies 1207 with the content.

Figure 13:
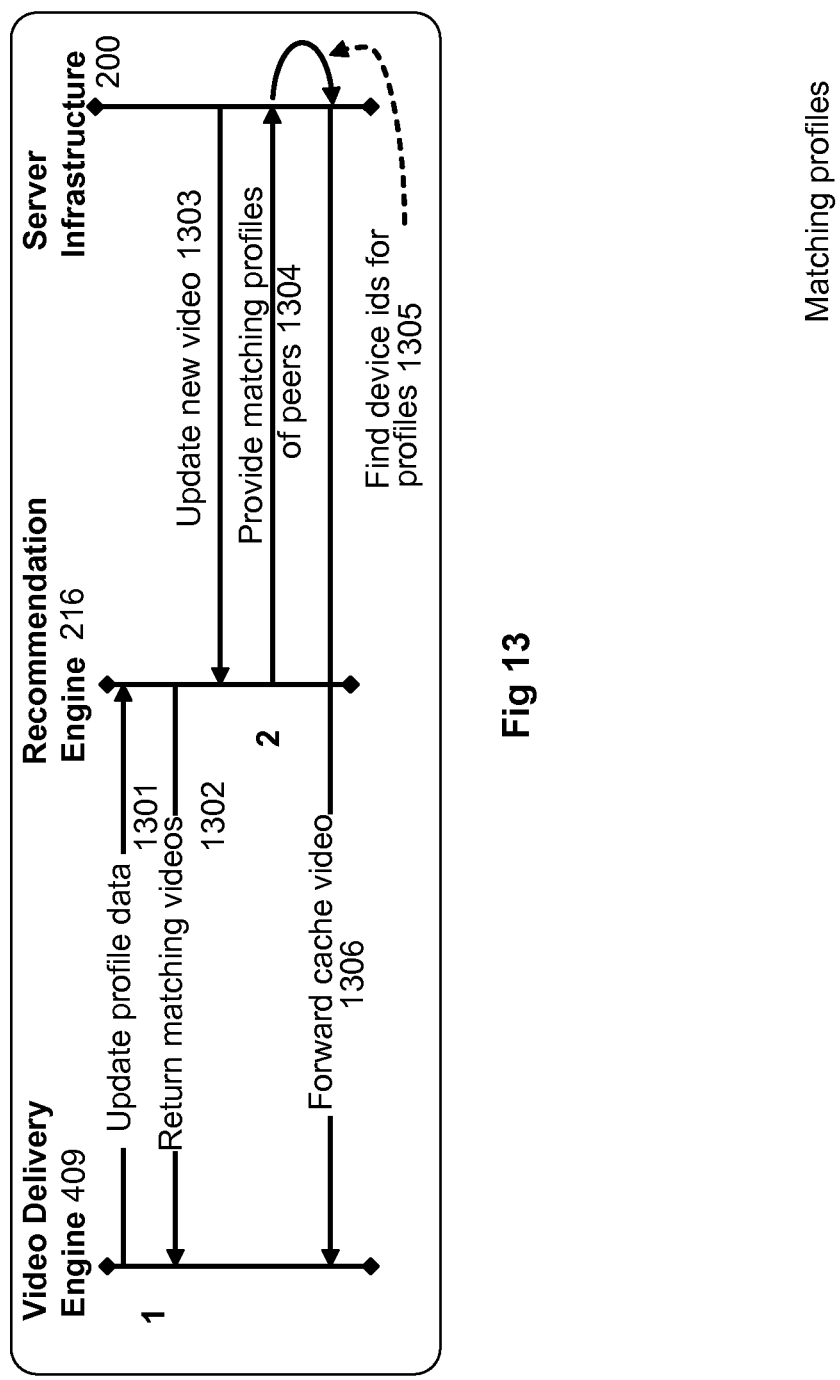
FIG. 13 is an interaction diagram illustrating one embodiment of the process by which the server infrastructure forward caches videos based on information from a recommendation engine.
Figure 14:
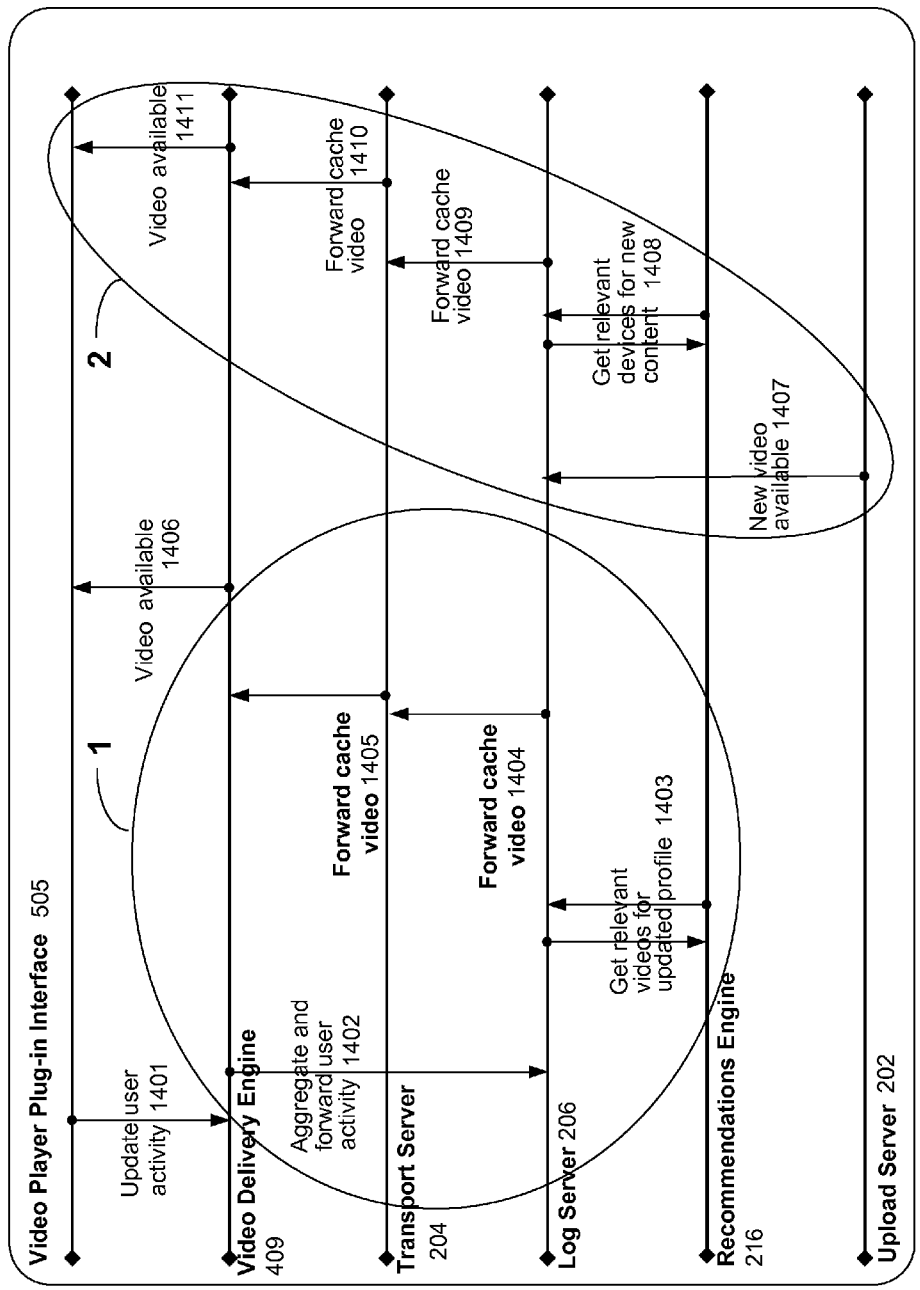
FIG. 14 is an interaction diagram illustrating one embodiment of the process of profiling data and forward-caching of videos.

In an alternate embodiment the peer device drives the content selection based on recommendations. FIG. 13, FIG. 14 described later illustrate embodiments where the recommendation is triggered by the profile change or the addition of a video. This profile data is used to match the most relevant content that the user is very likely to consume in the near future. The set of content thus filtered, that the user is most likely to consume, is then pushed to the peer device 305 using forward-caching so that the content is available ahead of the time the user is likely to consume it. The process of matching the user's profile with the content that the user is most likely to consume can happen in an external recommendations engine. The input to the recommendation engine 216 includes the initial set of content metadata as well as the initial set of profiles of all the users. As new content becomes available, the new content metadata is sent 1206 to the recommendations engine via the log server 206. The recommendations engine returns 1207 a set of profiles that is most likely to consume the new content. Similarly, when a profile is updated and the updated profile is input to the recommendations engine, the engine returns 1207 a set of content the new profile is likely to consume.

The actual delivery 1208 of the recommended content to the user happens over the distributed video delivery architecture. The events that trigger updates to the profiles are gathered in the video delivery engine 409 and flow as event logs to the log server 206. The metadata information about the content is gathered from the server infrastructure components.

Following are examples of some of the activities that a user performs on the peer device 305 that will trigger an update to the profile data. The examples include:
(1) Subscription to a new channel of content. For example: The user subscribes to the music videos channel from a video destination site. (2) Download of some content. For example: The user downloads the movie trailer for an action thriller movie releasing in the theatres in the upcoming week; (3)

Repeated consumption of certain content. For example: The user adds a song to his playlist and listens over and over again; (4) The user browses different web pages at any web site. For example: The user reads about French recipes on a cooking web site; (5) The user triggers the download of some content to one of his electronic devices from a remote electronic device (say, office computer or a friend's cell phone). For example: The user gets to know about a really cool movie from his friend and he orders the movie to be recorded to his set top box via his friend's cell phone); (6) The user shares some content (for example, video/channel) via email/SMS or the user receives some shared content; (7) The user gifts a content to someone else or the user receive some content as gift; (8) The user uploads some content or the user previews some content; (9) The user searches for some content; (10) The user creates a play list; (11) The user subscribes to a tag; and/or (12) The user purchases some content. (13) The user clicks or interacts with an advertisement.

Following are some examples of the parameters that are tracked in the profile data. The examples include: (1) The genre of the content. For example: if the user watches a movie like "Philadelphia" which has the genre "drama"; (2) The production time of the content. For example: if the user watches a music video "Dangerous", this will be the month and year when Dangerous was first released; (3) The main characters in the content. For example, if the user watches a documentary on "Indian Freedom Movement", the main characters would be "Mahatma Gandhi", "Jawaharlal Nehru" etc.; (4) The culture to which the video belongs. For example, if the user watches a Chinese war movie like "Hidden Dragon and Crouching Tiger", the culture will be Chinese/Mandarin; (5) The highly specific keywords in the content. For example, for a documentary video on "The Inconvenient Truth", the keywords will be "global warming", "pollution" etc. This could be derived from the closed captions within the video or could be manually annotated; (6) Content already consumed by the user. This tracks the past behavior of the user; (7) The rate at which the user consumes content. For example, the number of videos the user watches in a day; (8) Geographical location of the user; (9) Price range in which the user purchases content; (10) Average view time of the content a user watches; and/or (11) Content which is watched by his network (friends/buddy) (12) The keywords of the advertisements that user clicks on or favorably interacts with (13) The keywords of the advertisements that the user dismisses or with which there is an unfavorable interaction.

When the user does any of the activities that trigger an update of the profile data, the content that was being consumed or enabled to be consumed is analyzed for the set of parameters mentioned above. Each of those parameters is then appended into the profile data in a meaningful way. For example, when a user watches a movie of genre "Action", the count of "Action" movies that the user has watched so far is incremented by 1.

The profile data need not be a detailed list of all activities that the user has performed hitherto, but it could be a gist of the kind of activities and the kind of content the user likes to consume. Hence, if an activity is not significant in relation to the profile of a user, the activity could be ignored or partially taken into consideration. For example, the profile data could limit the number of genres a user is interested up to a predetermined number, e.g., 10. Upon a trigger by user activity, if the system detects that the user watched a genre that is not among the top 10 genres that the user has yet watched, the new genre will be ignored.

Selecting the Relevant Content to be Forward-Cached:

Referring next to FIG. 13, it illustrates the process for selecting relevant content to be forward-cached. The process includes the video delivery engine 409, the recommendation engine 216, and the server infrastructure 200. Every activity by the user is a potential point at which the system evaluates the set of relevant content to be pushed to the peer device 305. The video deliver engine 409 sends 1301 an updated profile to the recommendations engine 216, which returns 1302 a set of content that is most likely to be consumed by the updated profile. In addition, every time a new content is made available to the system, the recommendation engine 216 is informed 1303 by the server infrastructure 200 of the availability of the new content. The recommendation engine 216 can provide 1304 matching profiles of peers to which the new content can be pushed to. In one embodiment, the module of the server infrastructure that performs the interactions shown in FIG. 13 is the log server 203. Based on the user's consumption rate for the content and whether the user has previously consumed a given content, the set of content rated at the top is then chosen to be forward-cached 1306 to the peer device 305. Also, the system could subscribe the user to a group of content (a channel) if the system derives that the likelihood of the user watching all content in the channel is very high.

Importing Profile Data from Other Systems:

User profile data can also be gathered from other video delivery systems that deliver videos for a user's consumption. The video metadata maybe available from specific web sites or from a set of websites which are served by a given delivery system. The profile data will include the set of parameters listed in the "Parameters tracked in the user profile data" section. The log server 206 aggregates this profile data along with the one directly obtained from the user's peer device 305.

Use of the Profile Data:

The user profile data is used in many occasions. For example, it may be used to select the list of advertisements to be shown to a user while watching free content. In another example, it may also be used to select the set of DVD rental recommendation made to a user. For example, based on the videos a user watches online, the user can be recommended similar movies to be rented from a video rental store. It may also be used to discover users of similar taste. This builds a social community of users with similar taste for content.

In addition, the profile data of a user can be integrated with an existing social networking application like Facebook to enrich and augment the user's profile at the site.

Implementation:

The master profile data for a user resides in the device DB 209. However, the cached copy of the profile data is available on the user's peer device 305 in the form of cookies in the web browser or as application data within the events/profile manager 408 and saved on the file system 407. Any updates to the profile data based on any of the triggers goes to the local copy of the profile data which is then periodically updated and synchronized with the log server. When an action needs to be taken based on the user profile, the either of these profiles can be used to make the decision.

Consider a user who watched the videos v1, v2, . . . , vn on the user's video player 501 integrated with the video delivery engine. With the request for every video in the set the user watched, the system will evaluate a list of videos that can be recommended to the user based on the videos watched so far. With each video, the relevance to the recently watched content is also made available. Let the list of recommended videos be (r1, p1), (r2, p2), . . . (rm, pm) of m distinct videos where ri is the ith video and pi is the relevance value for ri. The user will be shown this recommendation set so that the user can discover these videos which otherwise he/she may not. In addition, if the relevance value for any of the video is above a certain threshold, say, more than 80% relevant to the recent content the user watched, the video will be automatically downloaded and made available to the user as a forward-cached video.

In certain embodiments, the relevance computation happens on the recommendation engine 216 and the computation used changes based on the kind of query made. One such computation could be weighted sum. Consider a user who browses various web pages. Every time the user views a unique page on a website connected to the log server, some information about the page is added to a cookie storing the profile data on the user's browser. Based on the pages the user visits, the user will be recommended a set of videos. This time, the matching happens at the server end, where the cookie information is used to find the matching content. This is then returned via the web site to the user and is presented to the user in the web page the user is browsing.

The inventory of videos in other CMS's can also be connected with the system. Say the user browsing a set of web pages is about to be recommended a list of videos. The universe of the all videos that can be recommended includes all the CMSs connected to the system. Consequently, it is possible that a user gets recommended to visit a totally new web site which has some videos very relevant for the user. In addition, if the relevance score for that video is more than the threshold, the video will be auto downloaded or forward-cached for the user.

Turning next to FIG. 14, it shows the two paths by which videos are made available to the video player plug-in interface 505 in one embodiment. The process includes the upload server 202, the recommendations engine 216, the log server 206, the transport server 204, the video delivery engine 409, and the video player plug-in interface 505. A first path (1) is triggered by some user activity and a second path (2) is triggered by the addition of a new video into the system. The recommendations engine 216 produces a list of profiles where the content is likely to be consumed or the list of contents a profile is likely to consume. The log server 206 of the server infrastructure 200 consumes this list and finds out the best possible match based on filtering the list for redundancy and picks only those that have relevance above a certain high threshold (like 80% mentioned above). The content is then forward-cached to those profiles.

The steps of the first path illustrated in FIG. 14 are as follows. The video player plug-in interface 505 informs 1401 the video delivery engine 409 of user activities relevant for updating the user profile. The video delivery engine 409 aggregates and forwards 1402 information related to the user activities to the log server 206. The log server 206 gets 1403 the relevant videos for the updated profile from the recommendations engine 216. The video relevant to the profile is forward-cached 1404 from the log server 206 to the transport server 204 and forward-cached 1405 to the video delivery engine 409. The video delivery engine 409 informs 1406 the video player plug-in interface 505 of the availability of the video. Thus, the activities of a user in a peer may cause updates to the user profile, resulting in a video being forward-cached to the video delivery engine 409 of the peer.

The steps of the second path illustrated in FIG. 14 are as follows. The upload server 202 informs 1407 the log server if a new video becomes available. The log server 206 gets 1408 the devices that are expected to be interested in the new video. The video relevant to the profile is forward-cached 1410 from the transport server 204 to the video delivery engine 409. The video delivery engine 409 informs 1411 the video player plug-in interface 505 of the availability of the video. Thus, the information that a new video is available is communicated from the upload server 202 to the video player plug-in interface and a portion of the video is forward-cached to the video delivery engine 409.

The two paths shown in FIG. 14 are shown as part of the same interaction diagram for sake of illustration. The two paths may be repeated multiple times. The execution of the two paths is independent of each other and interactions in one path may be interleaved with interactions from another path.

Collaborative Filtering

The log server 206 also does collaborative filtering to find out the list of peer devices 305 that are similar to a given peer device 305. It does this based on the information on the videos delivered as well as on the set of events triggered and the generated profiles. It is likely that the peer devices 305 that often serve videos to or get served from a given peer device 305 will tend to have similar profiles. This allows the log server 206 to forward-cache a video to the peers that are most similar to a peer that recently played the video.

The log server 206 tracks the list of videos delivered to a given peer. This allows the log server 206 to construct a vector for each peer. The vector will have the ordered list of videos that has been delivered to the peer. For example, if there are 10 videos in all within the system a vector (1, 0, 0, 0, 0, 1, 0, 0, 0, 0) representing a peer p will indicate that the peer p was delivered video number 1 and number 6 among the 10 videos. If there are n videos in the system at any given point in time, the vector representing a peer will be n dimensional. To find the similarity between any two peers, p1 and p2, the cosine value of the two vectors is computed. The cosine takes values in the range from 0 to 1, both inclusive and if the cosine is closer to 1, the two peers are more similar while if the cosine is closer to 0, they are more dissimilar. This allows for the prediction that if among two similar peers, one of them was delivered a particular video, the other is also likely to request for it in the future. This causes the system to forward-cache the video to the other peer.

In addition, the tracker server 204 tracks which peer has served which other peers. Over a period of time, the tracker server 204 is able to build a network graph where it is easy to identify clusters of closely related peers that have served each other numerous videos. This indicates their network proximity as well as the similarity in behavior to consume common videos. The tracker server 204 constructs a similar vector for each peer as the one constructed by the log server. The difference is—instead of listing the videos delivered to the peer, the elements in the vector represent the peers that delivered videos to this peer. Thus if there are n peers in the system, the vector will be n dimensional. The cosine for any two peers receiving videos from the same set of peers is likely to be closer to 1. This allows the tracker server 204 to identify clusters of peers that have very high similarity among each other. If one of the peers consume a new video, it is likely that the rest of the peers in the cluster will consume the video and hence provides an opportunity to forward-cache. Since the network proximity is also included in the similarity value, the video chosen can be delivered at comparatively lower costs.

In a certain embodiment, the log server 206 does association rule mining on the set of videos watched by the population of devices to arrive at the likely videos that a device would consume given the videos that are already consumed at the device. Such videos will be forward cached if the prediction has a very high confidence.

Example Applications of Architecture
Delivery of Offline Advertisements:

The forward caching mechanisms described above are used to deliver video advertisements in addition to the video files. The video delivery engine caches a list of video advertisements that match the profile of the device. Each advertisement shares some keywords with certain videos which help the initial placement of those advertisements along with those videos. Subsequently, the log server 206 determines the likely videos and the likely peer devices 305 where the advertisement can get a favorable response. The advertisement is forward cached on the peer devices that are likely to see videos in the same cluster as the videos that share the same keywords with the advertisement. Moreover, the advertisement is forward cached on to the peer devices that belong to the same cluster as the peer devices that responded favorably to the advertisement. Both these effects make the advertisement flow to those peer devices that are highly likely to treat the advertisement favorably.

The advertisements are forward cached in their entirety. Upon requests from the video controls manager, the video delivery engine matches the most appropriate advertisement based on the current video being played back, the profile of the device, the time of day and other metadata of the advertisement. The top list of advertisements are then played in a non repeatable fashion.

For every playback or interaction on the advertisement, the information is stored locally in the storage manager until it can be sent to the log server 206. The log server 206 sends the information back to the advertisement network via the advertisement server. The interaction with the advertisement also causes an update on the profile of the device.

Delivering Live Video:

The architecture enables the delivery of live video by extending the process of delivery on demand videos to support live video multicast using the generation number scheme. The generation number scheme has the advantage of being robust against failure of individual peer devices 305 as compared to a multicast scheme based on distributed hash tables. The scheme is also reliable in terms of coverage to all peer devices 305 in the network. The latency for the delivery of live video is bounded by generation number which reflects the height of the multicast tree.

CDN Switching Capability:

The architecture enables the ability to use multiple CDNs 219. In one embodiment, the upload server can be set up to segment a video file upon upload. Once the video has been segmented, each of the segments can be served from multiple CDNs 219. The upload server can be configured with more than one overlay delivery node 212 addresses to which the segments will be uploaded to. The publisher configures the set of CDNs 219 that the content should be uploaded to. The publisher also specifies the cost per GB for each CDN 219 as well as the time to first byte for each CDN 219. During the upload process, the video is segmented and each of the segments is uploaded to all the configured CDNs 219.

When a video is played back at the user's device, each of the segments of the video could be delivered from any of the configured CDNs 219. For each segment, the CDN that delivered the segment will be chosen based on the cost of the CDN 219 and the performance metrics for the CDN 219. For example, the first few segments of the video could come from a CDN 219 with a higher performance metric at an increased cost, while the rest of the segments could come from the CDN 219 with the lowest cost.

Some of the configured overlay delivery nodes 212 could be an origin server or a data center that is connected to a transit or peering location. Typically, the cost of such an origin server is likely to be much lower compared to a CDN 219 and is measured not as cost per GB but as a monthly cost per Mbps sustained on the output port of the server. The publisher can specify that cost per Mbps and the threshold Mbps that should be sustained at the output port of the server. If the threshold Mbps is above the current date rate at the server, the server could be selected to deliver segments for the video.

Certain CDNs 219 have better performance in certain geographic regions of the world while have poor performance at other regions. A CDN 219 can be specified per geography so that when a request comes from a device in that geography, this particular CDN 219 will be preferred over other CDNs 219.

This ability to switch CDNs 219 based on the location of the device and the cost characteristics of the CDNs 219 helps reduce the total cost of delivery. It also has the impact of improving the network utilization of the origin servers as the origin servers will be used for delivery whenever they are available because of their low cost.

Multisource without a Device Install:

The architecture enables the ability to deliver from a multitude of video sources, for the purposes of reducing costs and/or increasing throughput of delivery, without relying on a video delivery process, or client, running on the device. In one embodiment, the video player plug-in interface 505 is able to implement the delivery cost optimizations. This obviates the need for downloading and installing the video delivery process on the device. The video player plug-in interface 505 implements the delivery cost optimizations using video segments instead of video chunks. Also the cost of delivery from the overlay delivery nodes 212 as well as the performance of the overlay delivery nodes 212 is taken into account to do the optimization.

The video playback starts as well as the first segment starts downloading. As the video segments are fetched the video playback continues smoothly until the end of the video. The video segments could be delivered from multiple overlay delivery nodes 212 or peer devices 305 thereby constituting a multi source delivery.

The architecture obviates the need for the install as the video player plug-in interface 505 can assemble the segments to provide a smooth playback of the entire video. The video controls manager 502 in the video player plug-in interface 505 controls the player APIs so as to start the playback of the next video segment as soon as the previous segment finishes playback. The video controls manager 502 also receives the precise duration for playback of each of the segments and uses this information to initiate the playback of the subsequent segment as well as the playback time for the current segment ends. The video controls manager 502 is also able to track the current play head position of the current segment. This allows the video controls manager 502 to monitor when the current video segment is about to finish playback and accommodate any fluctuations in playback caused by the player or by the user (for example, by pressing pause or seek on the player).

Mobile Device Delivery

Figure 19:
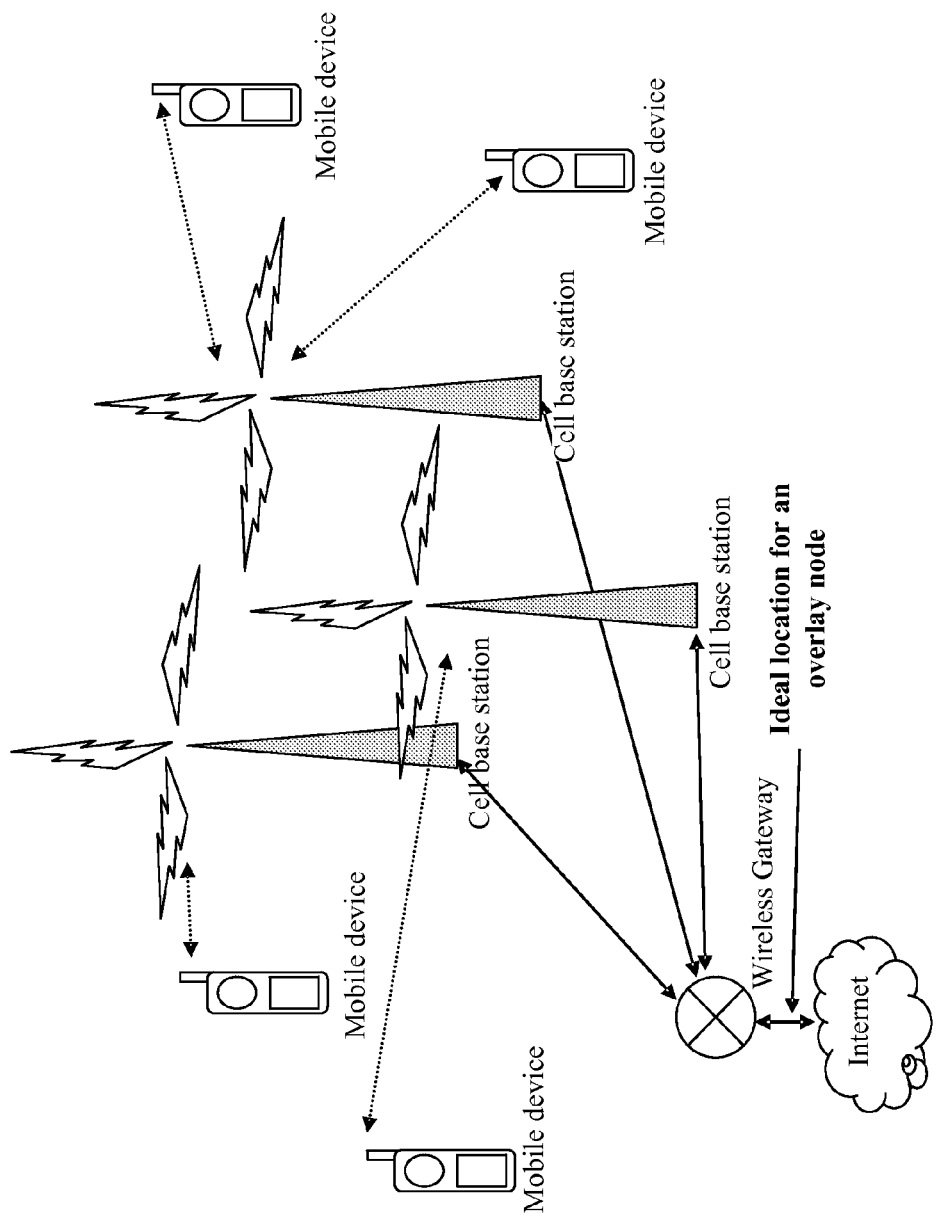
FIG. 19 shows one embodiment of a wireless network architecture.

The network infrastructure at a mobile device may differ from network infrastructure of the wired networks. FIG. 19 shows one embodiment of a wireless network architecture. The wireless cellular networks connect to the wired internet at wireless gateway points which connect to one or more base stations. The wireless devices connect with the base stations over radio waves. The spectrum available to the mobile wireless devices is quite limited both because the spectrum is shared between multiple mobile devices as well as because the total data carrying capacity of the spectrum is limited. This implies that the cost for the hop from the base station to the wireless device is many times the cost of a hop in a wired network. Also, typically, the upload and download bandwidth is a small fraction of the bandwidth available via the wired internet. Hence, when a mobile device requests a video, the cost of delivering from other peer devices 305 that are also mobile is considerably higher than peer devices 305 that are located in the wired internet beyond the wireless gateway. In one embodiment, overlay delivery nodes 212 are placed as close to the wireless gateways as possible so as to improve the video delivery characteristics and alleviate the need to use other mobile peer devices.

Some mobile devices 305 are capable of using multiple network interfaces. For example, an APPLE IPHONE can pick the cell based network for internet traffic when an 802.11 based wireless LAN network is not available. Thus the network cost characteristics at the peer device 305 could change based on the network interface being used to transfer data. In one embodiment, a peer device 305 is sensitive to these cost changes as the network interface available changes and will use the least cost network interface to fetch and delivery video when possible. In addition, for forward caching of videos to these devices, the forward caching will take place when the cost on the network interface used is the least. This implies that a cell phone capable of using 802.11 wireless LAN interface may cache a video via forward caching when the 802.11 network interface is active (assuming 802.11 is much cheaper than the regular cell based network interface). Typically, such a phone device, may be forward caching videos during non-business hours when the user is at home where the 802.11 connectivity is available.

In another embodiment, the device 305 may not have connectivity to multiple network interfaces. However, the device 305 can detect the cost on the network interface changes during the course of the day. For example, a wireless carrier may offer the use of the spectrum at a cheaper rate or for free at off peak hours. Also, in certain countries, the wired internet connection is metered during business hours and is offered for free during non-business or non-peak hours. A schedule input at the device allows the video delivery manager 303 to be sensitive to these cost fluctuations and take advantage of the reduced cost for forward cached video deliveries.

Additional Architectural and Process Configuration Details

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description that follows are presented in terms of algorithms or processes and symbolic representations of operations on data bits within a computer memory, for example, as described with respect to FIGS. 1, 2, 7-9 and 11-14. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for delivering a video to a peer device using a distributed architecture through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method executing within one or more computing devices for delivering a video to a first destination node, the method comprising:
receiving a request for playback of a video at the first destination node;
identifying a list of peer nodes that can deliver the video to the first destination node;
identifying a plurality of second destination nodes that share one or more attributes in common with the first destination node;
determining a cost associated with delivery from each peer node, wherein the cost associated with delivery from each peer node is calculated, in part, on the basis of performance data previously received from the second destination nodes;
identifying a peer node from the list of peer nodes based on a cost of delivering the video within the network, wherein the cost of delivering the video within the network is based on the determined cost associated with delivery from said identified peer node; and
enabling the first destination node to receive the video from the identified peer node.

2. The method of claim 1, wherein the cost associated with delivery from each peer node is calculated, in part, on the basis of performance data previously received from the second destination nodes and performance data previously received from the first destination node.

3. A computer program product having a non-transitory computer-readable storage medium storing computer-executable code for streaming a video to a first destination node, the code comprising:
program code for receiving a request for playback of a video at the first destination node;
program code for identifying a list of peer nodes that can stream the video to the first destination node;
program code for identifying a plurality of second destination nodes that share one or more attributes in common with the first destination node;
program code for determining a cost associated with delivery from each peer node, wherein the cost associated with delivery from each peer node is calculated, in part, on the basis of performance data previously received from the second destination nodes;
program code for identifying a peer node from the list of peer nodes based on a cost of delivering the video within the network, wherein the cost of delivering the video within the network is based on the determined cost associated with delivery from said identified peer node; and
program code for enabling the first destination node to receive the video from the identified peer node.

4. A method executing within one or more computing devices for storing one or more files within a set of storage nodes, the method comprising:
determining a file list of the one or more files that are likely to be consumed by one or more destination nodes;
receiving a list of storage nodes to store the one or more files on the file list such that the one or more files can be retrieved by one or more destination nodes;
determining a cost associated with retrieval from each storage node with respect to the one or more destination nodes,
selecting one or more storage nodes to store the one or more files on the file list so as to reduce at least one aspect of the determined cost; and
enabling the storage of the one or more files on the file list to the selected storage nodes.

5. The method of claim 4, wherein the set of storage nodes comprise a network.

6. The method of claim 4, wherein the cost is related to a projected performance in retrieval at a destination node from a storage node.

7. The method of claim 4, wherein the one or more files are a segment of a video, and the cost varies based on a position of the segment in the video or a bitrate of the segment, within the video.

8. The method of claim 4, wherein the cost is determined based on popularity of the one or more files.

9. The method of claim 4, wherein the cost depends on a projected number of times that the one or more files will be retrieved from the one or more storage nodes over a projected time period.

10. The method of claim 4, wherein selecting storage nodes is based on locations of prospective destination nodes.

11. The method of claim 4, wherein determining the file list is based on analyzing previous consumption of other files at the one or more destination nodes.

12. The method of claim 4, wherein determining the file list is based on analyzing consumption of other files by a user of a destination node.

13. The method of claim 4, wherein determining the file list is based on recommendations determined from usage at destination nodes similar to a destination node of a user, usage of friends of the user, and usage of the user.

14. The method of claim 4, wherein the destination node is a storage node.

15. The method of claim 4, wherein determining the file list includes determining nodes that are similar to the destination node, and analyzing content consumed in such similar nodes.

16. The method of claim 4, wherein one or more files in the file list is delivered to the destination node at a time when preferred connectivity to that destination node becomes available, where such preference is related to at least cost.

* * * * *